United States Patent
Egilmez et al.

(10) Patent No.: US 10,715,802 B2
(45) Date of Patent: Jul. 14, 2020

(54) METHOD FOR ENCODING/DECODING VIDEO SIGNAL BY USING SINGLE OPTIMIZED GRAPH

(71) Applicants: LG Electronics Inc., Seoul (KR); UNIVERSITY OF SOUTHERN CALIFORNIA, Los Angeles, CA (US)

(72) Inventors: Hilmi E. Egilmez, Los Angeles, CA (US); Sehoon Yea, Seoul (KR); Antonio Ortega, Los Angeles, CA (US); Onur G. Guleryuz, San Jose, CA (US); Jana Ehmann, San Jose, CA (US)

(73) Assignees: LG ELECTRONICS INC., Seoul (KR); UNIVERSITY OF SOUTHERN CALIFORNIA, Los Angeles, CA (US)

( * ) Notice: Subject to any disclaimer, the term of this patent is extended or adjusted under 35 U.S.C. 154(b) by 1 day.

(21) Appl. No.: 15/764,230

(22) PCT Filed: Sep. 29, 2016

(86) PCT No.: PCT/KR2016/010914
§ 371 (c)(1),
(2) Date: Mar. 28, 2018

(87) PCT Pub. No.: WO2017/057923
PCT Pub. Date: Apr. 6, 2017

(65) Prior Publication Data
US 2018/0288411 A1    Oct. 4, 2018

Related U.S. Application Data

(60) Provisional application No. 62/234,638, filed on Sep. 29, 2015.

(51) Int. Cl.
*H04N 19/176*    (2014.01)
*H04N 19/134*    (2014.01)
(Continued)

(52) U.S. Cl.
CPC ............. *H04N 19/11* (2014.11); *H04N 19/13* (2014.11); *H04N 19/134* (2014.11);
(Continued)

(58) Field of Classification Search
CPC ...... H04N 19/176; H04N 19/61; H04N 19/14; H04N 19/124; H04N 19/147; H04N 19/60;
(Continued)

(56) References Cited

U.S. PATENT DOCUMENTS

| | | | |
|---|---|---|---|
| 2013/0272422 A1* | 10/2013 | Lee et al. ............. | H04N 19/176 375/240.18 |
| 2015/0112897 A1* | 4/2015 | Wang ........................ | G06T 5/20 706/12 |
| 2018/0091817 A1* | 3/2018 | Sole ...................... | H04N 19/176 |

FOREIGN PATENT DOCUMENTS

| | | |
|---|---|---|
| JP | 2014-7477 A | 1/2014 |
| JP | 2014-195324 A | 10/2014 |

(Continued)

OTHER PUBLICATIONS

Yung-Hsuan Chao et al., "Edge-Adaptive Depth Map Coding with Lifting Transform on Graphs", 2015 Picture Coding Symposium (PCS), May 31-Jun. 3, 2015, pp. 60-64, See sections 2-6 and figures 1-7.

*Primary Examiner* — Dave Czekaj
*Assistant Examiner* — Samuel D Fereja
(74) *Attorney, Agent, or Firm* — Dentons US LLP

(57) ABSTRACT

The present invention provides a method for encoding a video signal by using a single optimized graph, comprising the steps of: obtaining a residual block; generating graphs from the residual block; generating an optimized graph and an optimized transform by combining the graphs, wherein the graphs are combined on the basis of an optimization step;

(Continued)

and performing a transform for the residual block on the basis of the optimized graph and the optimized transform.

9 Claims, 15 Drawing Sheets

(51) Int. Cl.
  *H04N 19/11* (2014.01)
  *H04N 19/13* (2014.01)
  *H04N 19/85* (2014.01)
  *H04N 19/90* (2014.01)
  *H04N 19/96* (2014.01)
  *H04N 19/91* (2014.01)

(52) U.S. Cl.
  CPC ........... *H04N 19/176* (2014.11); *H04N 19/85* (2014.11); *H04N 19/90* (2014.11); *H04N 19/91* (2014.11); *H04N 19/96* (2014.11)

(58) Field of Classification Search
  CPC ........ H04N 19/12; H04N 19/46; H04N 19/19; H04N 19/122; H04N 19/126; H04N 19/159; H04N 19/18; H04N 19/91; H04N 19/103; H04N 19/182; H04N 19/96; H04N 19/105; H04N 19/117; H04N 19/13; H04N 19/136; H04N 19/154; H04N 19/172; H04N 19/593; H04N 19/11; H04N 19/119; H04N 19/192; H04N 19/44; H04N 19/82; H04N 19/134; H04N 19/196; H04N 19/90; H04N 19/129; H04N 19/137; H04N 19/463; H04N 19/649; H04N 19/107; H04N 19/157; H04N 19/177; H04N 19/50; H04N 19/597

See application file for complete search history.

(56) References Cited

FOREIGN PATENT DOCUMENTS

| KR | 10-2011-0093532 A | 8/2011 |
| KR | 10-2011-0135787 A | 12/2011 |

* cited by examiner (a)

(b)

(a)

(b)

(a) Input graphs: L1, L2, L3, L4, L5

(b) Combined graphs: $L^{avg}$ and $L^*$ (a) Input graphs: L1, L2, L3, L4, L5

(b) Combined graphs: $L^{avg}$ and $L^*$

FIG. 14

| CG | L1 | L2 | L3 | L4 | L5 | Average |
|---|---|---|---|---|---|---|
| $U^*$ | 0.8298 | 0.8586 | 0.9066 | 0.8319 | 0.8812 | 0.8616 |
| $U^{avg}$ | 0.8216 | 0.8102 | 0.8160 | 0.8125 | 0.8061 | 0.8133 |

(a) Coding gain results for line graphs of FIG. 12

| AQC | L1 | L2 | L3 | L4 | L5 | Average |
|---|---|---|---|---|---|---|
| $L^*$ | 14.334 | 14.102 | 13.094 | 15.8391 | 12.867 | 14.047 |
| $L^{avg}$ | 20.797 | 20.068 | 22.061 | 21.971 | 19.506 | 20.881 |

(b) Average quadratic cost results for line graphs of FIG. 12

FIG. 15

| CG | L1 | L2 | L3 | L4 | Average |
|---|---|---|---|---|---|
| $U^*$ | 0.9802 | 0.9023 | 0.9562 | 0.8936 | 0.9331 |
| $U^{avg}$ | 0.9050 | 0.8549 | 0.9521 | 0.8801 | 0.8981 |

(a) Coding gain results for graphs of FIG. 13

| AQC | L1 | L2 | L3 | L4 | Average |
|---|---|---|---|---|---|
| $L^*$ | 3.9576 | 4.6745 | 2.9700 | 5.1360 | 4.1845 |
| $L^{avg}$ | 5.8170 | 7.0549 | 4.2231 | 7.6249 | 6.1800 |

(b) Average quadratic cost results for graphs of FIG. 13

METHOD FOR ENCODING/DECODING VIDEO SIGNAL BY USING SINGLE OPTIMIZED GRAPH

CROSS-REFERENCE TO RELATED APPLICATIONS

This application is the National Stage filing under 35 U.S.C. 371 of International Application No. PCT/KR2016/010914, filed on Sep. 29, 2016, which claims the benefit of U.S. Provisional Applications No. 62/234,638, filed on Sep. 29, 2015, the contents of which are all hereby incorporated by reference herein in their entirety.

TECHNICAL FIELD

The present invention relates to a method and apparatus for encoding, decoding a video signal using a single optimized graph. Specifically, the present invention relates to a method and apparatus for performing a transform based on an optimal graph in which multiple graphs have been combined through an optimization process.

BACKGROUND ART

Compression encoding means a series of signal processing technologies for transmitting digitized information through a communication line or storing the information in a form suitable for a storage medium. Media, such as a picture, an image and voice, may be the subject of compression encoding. In particular, a technology performing compression encoding on an image is called video image compression.

Next-generation video content will have the features of high spatial resolution, a high frame rate, and high dimensionality of scene representation. In order to process such content, a tremendous increase in terms of memory storage, a memory access rate, and processing power will result.

Therefore, there is a need to design a coding tool for processing next-generation video content more efficiently.

In particular, a graph is a data expression form useful to describe inter-pixel relation information. A graph-based signal processing method of expressing such inter-pixel relation information in a graph form and processing the information is used. In many data-oriented applications, graphs provide a common tool for modeling the relationships between data sources. With respect to such applications, a weighted graph may be used to express similarities between data sources in which graph nodes indicate sources. Weighted edges indicate similarity between the weighted graphs. In particular, if interested data is a high degree, multiple graphs may be used to describe general relationships between sources. For example, in a social network, a plurality of graphs constructed based on different characteristics (e.g., friendship, political viewpoint and local location) may connect a plurality of people. In signal processing, multiple graphs may be used for the graphic modeling of a random signal having a mixed distribution (e.g., Gaussian mixed models).

DISCLOSURE

Technical Problem

The present invention is to design a new framework for combining multiple weighted graphs into a single optimization weighted graph.

The present invention is to provide statistical formulation for a graph combination using a maximum likelihood criterion.

The present invention is to propose a method of deriving optimal conditions for common graph transform (CGT) estimation and common graph frequency (CGF) estimation.

The present invention is to propose a method of determining an optimal combined graph by estimating the best common graph transform (CGT) and estimating the best common graph frequency (CGF).

The present invention is to propose a method of searching for the closest graph Laplacian matrix from a viewpoint of a maximum likelihood.

The present invention is to provide a common graph transform (CGT) algorithm proposed to solve a non-convex optimization problem.

Technical Solution

The present invention provides a new framework for combining multiple weighted graphs into a single optimization weighted graph.

The present invention provides statistical formulation for a graph combination using a maximum likelihood criterion.

The present invention provides a method of deriving optimal conditions for common graph transform (CGT) estimation and common graph frequency (CGF) estimation.

The present invention provides a method of determining an optimal combined graph by estimating the best common graph transform (CGT) and estimating the best common graph frequency (CGF).

The present invention provides a method of searching for the closest graph Laplacian matrix from a viewpoint of a maximum likelihood.

The present invention provides a common graph transform (CGT) algorithm proposed to solve a non-convex optimization problem.

Advantageous Effects

The present invention can provide better modeling compared to a commonly used averaged method by providing a new framework for combining multiple weighted graphs into a single optimization weighted graph, and can be applied to various applications in signal processing and machine learning.

The present invention can be usefully used for various cases by providing a method of determining an optimal combined graph. For example, if multiple graphic models are given for a data set, an optimized aggregate model close to the original models from a viewpoint of metrics. In this case, if a signal model is uncertain, a more robust model can be designed by combining multiple candidate models.

Furthermore, using a single optimized model may be advantageous from a viewpoint of computational complexity. Furthermore, a graph combination for summarizing data sets forming multiple graphs into a single graph is very useful for graph visualization upon performing the data analysis.

DESCRIPTION OF DRAWINGS

FIG. 14 is an embodiment to which the present invention is applied and is a table showing coding gain and average quadratic cost results for the graphs in FIG. 12.

FIG. 15 is an embodiment to which the present invention is applied and is a table showing coding gain and average quadratic cost results for the graphs in FIG. 14.

BEST MODE

Figure 1:
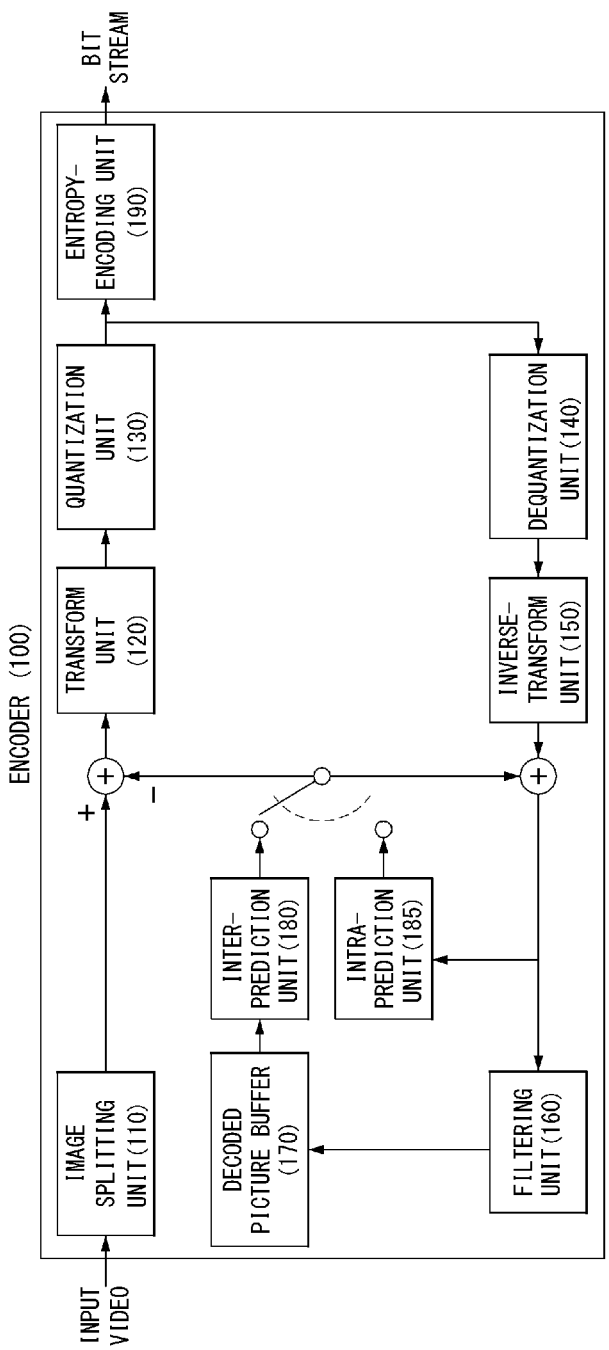
FIG. 1 shows a schematic block diagram of an encoder for encoding a video signal according to an embodiment of the present invention.

The present invention provides a method of encoding a video signal using a single optimized graph, including obtaining a residual block; generating graphs from the residual block; generating an optimal graph and an optimal transform by combining the graphs, wherein the graphs are combined based on an optimization process; and performing a transform for the residual block based on the optimal graph and the optimal transform.

In the present invention, the optimization process includes determining a common graph transform indicative of an optimal graph transform for a given set of graph Laplacian matrices; determining a common graph frequency based on the common graph transform, wherein the common graph frequency indicates a function of common graph transform frequencies obtained with respect to the given set of graph Laplacian matrices; and determining an optimal graph Laplacian matrix using a maximum likelihood function based on the common graph transform and the common graph frequency.

In the present invention, the method further includes further includes transmitting the optimal graph and the optimal transform.

In the present invention, the optimal transform is a non-separable transform and is orthonormal.

In the present invention, the optimal graph is determined based on an intra prediction mode used in the residual block.

In the present invention, the graphs are obtained using edge information of the residual block.

The present invention provides a method of decoding a video signal using a single optimized graph, including receiving the video signal including an optimal transform; obtaining a transform coefficient through entropy decoding and inverse quantization; and performing an inverse transform for the transform coefficient based on the optimal transform, wherein the optimal transform has been generated based on an optimal graph and the optimal graph has been generated by combining graphs based on an optimization process.

The present invention provides an apparatus for encoding a video signal using a single optimized graph, including a graph generation unit configured to generate graphs from a residual block; an optimization unit configured to generate an optimal graph and an optimal transform by combining the graphs; and a transform unit configured to perform a transform for the residual block based on the optimal graph and the optimal transform, wherein the graphs are combined based on an optimization process.

In the present invention, the optimization unit determines a common graph transform indicative of an optimal graph transform for a given set of graph Laplacian matrices, determines a common graph frequency based on the common graph transform, and determines an optimal graph Laplacian matrix using a maximum likelihood function based on the common graph transform and the common graph frequency. The common graph frequency indicates a function of common graph transform frequencies obtained with respect to the given set of graph Laplacian matrices.

The present invention provides an apparatus for decoding a video signal using a single optimized graph, including a reception unit configured to receive the video signal including an optimal transform; an entropy decoding unit configured to entropy-decode a residual signal; an inverse quantization unit configured to obtain a transform coefficient by inverse quantizing the entropy-decoded residual signal; and an inverse transform unit configured to perform an inverse transform for the transform coefficient based on the optimal transform, wherein the optimal transform has been generated based on an optimal graph and the optimal graph has been generated by combining graphs based on the optimization process.

MODE FOR INVENTION

Hereinafter, exemplary elements and operations in accordance with embodiments of the present invention are described with reference to the accompanying drawings, however, it is to be noted that the elements and operations of the present invention described with reference to the drawings are provided as only embodiments and the technical spirit and kernel configuration and operation of the present invention are not limited thereto.

Furthermore, terms used in this specification are common terms that are now widely used, but in special cases, terms randomly selected by the applicant are used. In such a case, the meaning of the corresponding term is clearly described in the detailed description of a corresponding part. Accordingly, it is to be noted that the present invention should not be construed as being based on only the name of a term used in a corresponding description of this specification and that the present invention should be construed by checking even the meaning of a corresponding term.

Furthermore, terms used in this specification are common terms selected to describe the invention, but may be replaced with other terms for more appropriate analysis if such terms having similar meanings are present. For example, a signal, data, a sample, a picture, a frame, and a block may be appropriately substituted and interpreted in each coding process. Further, partition, decomposition, split and segmentation, etc. may also be appropriately interchangeably used in each coding process.

FIG. 1 shows a schematic block diagram of an encoder for encoding a video signal, in accordance with one embodiment of the present invention.

Referring to FIG. 1, the encoder 100 may include an image segmentation unit 110, a transform unit 120, a quantization unit 130, an inverse quantization unit 140, an inverse transform unit 150, a filtering unit 160, a decoded picture buffer (DPB) 170, an inter-prediction unit 180, an intra-prediction unit 185, and an entropy-encoding unit 190.

The image segmentation unit 110 may divide an input image (or a picture or a frame) input to the encoder 100 into one or more process units. For example, the process unit may be a coding tree unit (CTU), a coding unit (CU), a prediction unit (PU) or a transform unit (TU).

However, the terms are used only for convenience of illustration of the present disclosure. The present invention is not limited to the definitions of the terms. In this specification, for convenience of illustration, the term "coding unit" is employed as a unit used in a process of encoding or decoding a video signal. However, the present invention is not limited thereto. Another process unit may be appropriately selected based on contents of the present disclosure.

The encoder 100 may generate a residual signal by subtracting a prediction signal output from the inter-prediction unit 180 or intra-prediction unit 185 from the input image signal. The generated residual signal may be transmitted to the transform unit 120.

The transform unit 120 may apply a transform technique to the residual signal to produce a transform coefficient. The transform process may be applied to a pixel block having the same size of a square, or to a block of a variable size other than a square.

The transform unit 120 may use a graph-based signal processing method of expressing inter-pixel relation information in a graph form and processing the information. For example, the transform unit 120 may include a graph-based transform unit. The graph-based transform unit may generate graphs from a residual signal, and may generate an optimal graph and an optimal transform by combining the graphs based on an optimization process. Furthermore, the graph-based transform unit may perform a transform for the residual signal based on the optimal graph and the optimal transform.

In order to perform the optimization process, the transform unit 120 may first determine a common graph transform indicative of an optimal graph transform for a given set of graph Laplacian matrices, may determine a common graph frequency based on the common graph transform, and may determine an optimal graph Laplacian matrix using a maximum likelihood function based on the common graph transform and the common graph frequency. The transform unit 120 may generate a graph-based transform kernel (GBT kernel) based on the optimal graph Laplacian matrix and perform a transform using the GBT kernel.

In one embodiment, the optimal transform may be a non-separable transform and may be orthonormal.

In one embodiment, the optimal transform may be transmitted to the decoder, but the present invention is not limited thereto. The optimal transform may be derived from the decoder. For example, the optimal graph Laplacian matrix may be transmitted to the decoder, and the optimal transform may be derived from the optimal graph Laplacian matrix.

In one embodiment, the optimal graph may have been determined based on an intra prediction mode used in the residual block.

In one embodiment, the graphs may have been obtained by edge information of the residual block.

For another example, the graph-based transform unit may generate at least one data cluster for video data, may generate at least one graph Laplacian matrix corresponding to the at least one data cluster, and may generate an optimized transform matrix by performing a transform optimization based on multiple graph-based models including the at least one graph Laplacian matrix.

The graph-based transform unit to which the present invention is applied may be present as a separate function unit. In this case, the graph-based transform unit may be located ahead of the transform unit 120, but the present invention is not limited thereto.

The quantization unit 130 may quantize the transform coefficient and transmits the quantized coefficient to the entropy-encoding unit 190. The entropy-encoding unit 190 may entropy-code the quantized signal and then output the entropy-coded signal as bit streams.

The quantized signal output from the quantization unit 130 may be used to generate a prediction signal. For example, the quantized signal may be subjected to an inverse quantization and an inverse transform through the inverse quantization unit 140 and the inverse transform unit 150 in the loop respectively to reconstruct a residual signal. The reconstructed residual signal may be added to the prediction signal output from the inter-prediction unit 180 or intra-prediction unit 185 to generate a reconstructed signal.

Meanwhile, in the compression process, adjacent blocks may be quantized by different quantization parameters, so that the deterioration of the block boundary may occur. This phenomenon is called blocking artifacts. This is one of the important factors to evaluate image quality. A filtering process may be performed to reduce such deterioration. Blocking deterioration may be eliminated using the filtering process. Furthermore, an error of a current picture can be reduced to improve image quality.

The filtering unit 160 may apply filtering to the reconstructed signal and then outputs the filtered reconstructed signal to a reproducing device or the decoded picture buffer 170. The filtered signal transmitted to the decoded picture buffer 170 may be used as a reference picture in the inter-prediction unit 180. As described above, using the filtered picture as the reference picture in the inter-picture prediction mode, not only the picture quality but also the coding efficiency may be improved.

The decoded picture buffer 170 may store the filtered picture for use as the reference picture in the inter-prediction unit 180.

The inter-prediction unit 180 may perform a temporal prediction and/or a spatial prediction with reference to the reconstructed picture to remove temporal redundancy and/or spatial redundancy. In this case, the reference picture used for the prediction may be a transformed signal obtained through the quantization and inverse quantization on a block basis in the previous encoding/decoding. Thus, this may result in blocking artifacts or ringing artifacts.

Accordingly, in order to solve the performance degradation due to the discontinuity or quantization of the signal, the inter-prediction unit 180 may interpolate signals between pixels on a subpixel basis using a low-pass filter. In this case, the subpixel may mean a virtual pixel generated by applying an interpolation filter. An integer pixel means an actual pixel existing in the reconstructed picture. The interpolation method may include linear interpolation, bi-linear interpolation and Wiener filter, etc.

The interpolation filter may be applied to the reconstructed picture to improve the accuracy of the prediction. For example, the inter-prediction unit 180 may apply the interpolation filter to integer pixels to generate interpolated pixels. The inter-prediction unit 180 may perform a prediction using an interpolated block composed of the interpolated pixels as a prediction block.

The intra-prediction unit 185 may predict a current block by referring to samples in the vicinity of a block to be encoded currently. The intra-prediction unit 185 may perform a following procedure to perform an intra-prediction. First, the intra-prediction unit 185 may prepare reference samples needed to generate a prediction signal. Then, the intra-prediction unit 185 may generate the prediction signal using the prepared reference samples. Thereafter, the intra-prediction unit 185 may encode a prediction mode. At this time, reference samples may be prepared through reference sample padding and/or reference sample filtering. Since the reference samples have undergone the prediction and reconstruction process, a quantization error may exist. Therefore, in order to reduce such errors, a reference sample filtering process may be performed for each prediction mode used for intra-prediction.

The prediction signal generated through the inter-prediction unit 180 or the intra-prediction unit 185 may be used to generate the reconstructed signal or used to generate the residual signal.

Figure 2:
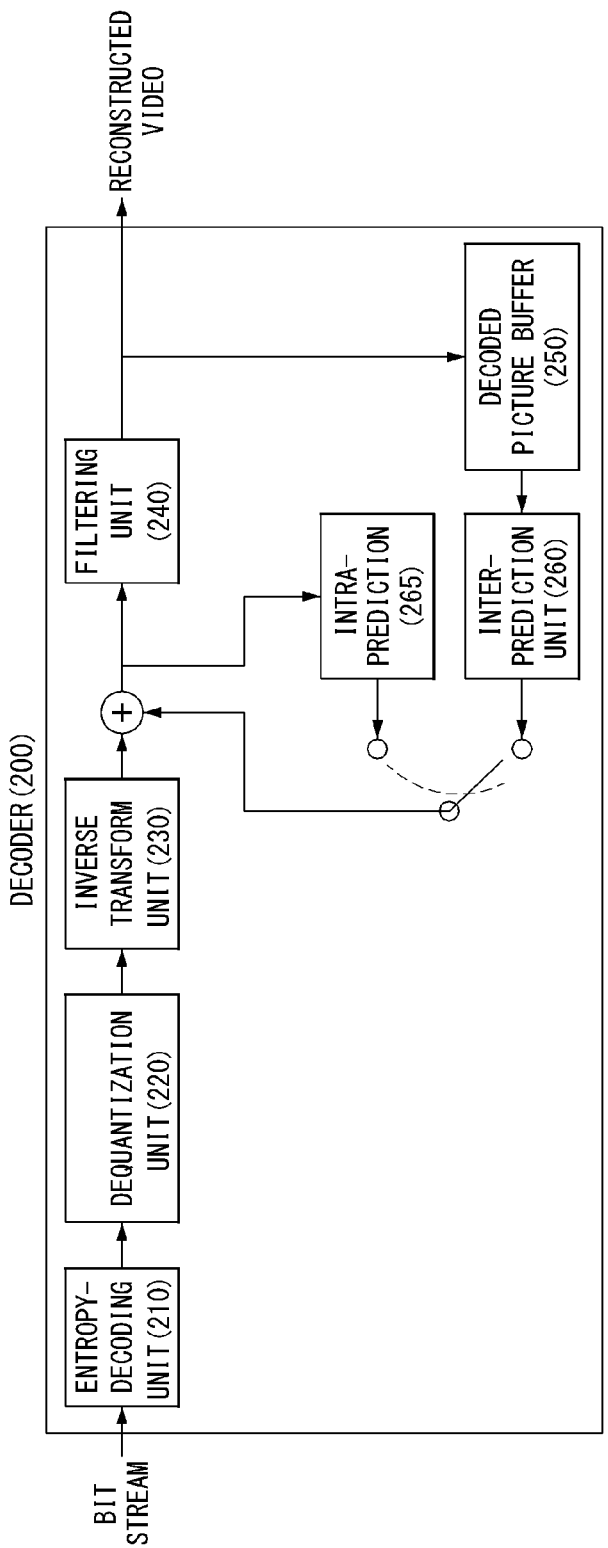
FIG. 2 shows a schematic block diagram of a decoder for decoding a video signal according to an embodiment of the present invention.

FIG. 2 shows a schematic block diagram of a decoder for decoding a video signal, in accordance with one embodiment of the present invention.

Referring to FIG. 2, a decoder 200 may include an entropy-decoding unit 210, an inverse quantization unit 220, an inverse transform unit 230, a filtering unit 240, a decoded picture buffer (DPB) 250, an inter-prediction unit 260 and an intra-prediction unit 265.

A reconstructed video signal output from the decoder 200 may be reproduced using a reproducing device.

The decoder 200 may receive the signal output from the encoder as shown in FIG. 1. The received signal may be entropy-decoded through the entropy-decoding unit 210.

In an embodiment of the present invention, the decoder or the entropy decoding unit 210 may receive a template index. Here, the template index may correspond to a transform matrix optimized based on multiple graph-based models.

The entropy-decoded template index may be transmitted to the inverse quantization unit 220 where the index may be inversely quantized. The inversely quantized index may be transmitted to the inverse transform unit 230 for further use.

The inverse quantization unit 220 may obtain a transform coefficient from the entropy-decoded signal using quantization step size information. In this case, the obtained transform coefficient may be associated with the operations of the transform unit 120 as described above with reference to FIG. 1.

The inverse transform unit 230 obtains a residual signal by inverse transforming the transform coefficient. In this case, a graph-based transform matrix used when performing the inverse transform may have been generated based on an optimal graph. The optimal graph may have been generated by combining graphs based on an optimization process.

In another embodiment of the present invention, the inverse transform unit 230 may obtain the graph-based transform matrix of the target unit corresponding to a template index, and may perform an inverse transform for the target unit using an inverse transform matrix derived from the graph-based transform matrix. For another example, the graph-based transform matrix may indicate an optimized transform matrix based on multiple graph-based models.

A reconstructed signal may be generated by adding the obtained residual signal to the prediction signal output from the inter-prediction unit 260 or the intra-prediction unit 265.

The filtering unit 240 may apply filtering to the reconstructed signal and may output the filtered reconstructed signal to the reproducing device or the decoded picture buffer unit 250. The filtered signal transmitted to the decoded picture buffer unit 250 may be used as a reference picture in the inter-prediction unit 260.

The detailed descriptions for the filtering unit 160, inter-prediction unit 180 and intra-prediction unit 185 of the encoder 100 may be equally applied to the filtering unit 240, inter-prediction unit 260 and intra-prediction unit 265 of the decoder 200 respectively.

Figure 3:
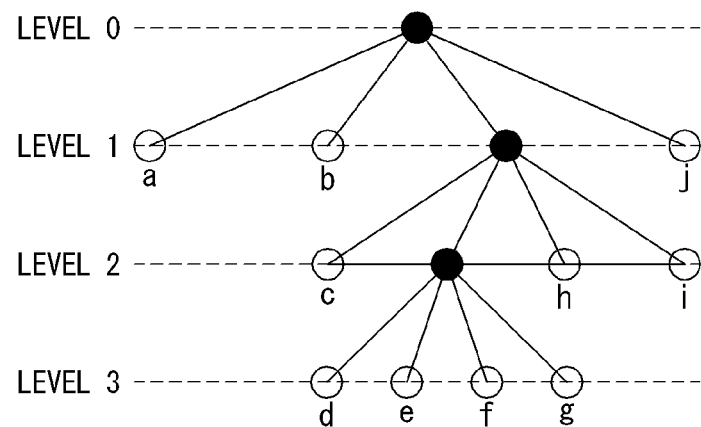
FIG. 3 is a diagram for illustrating the split structure of a coding unit according to an embodiment of the present invention.
Figure 3:
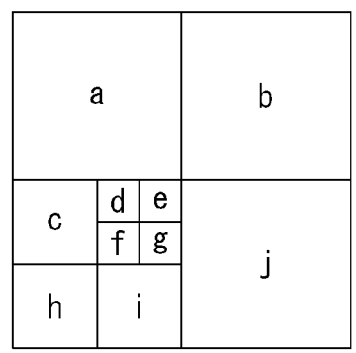

FIG. 3 is a diagram for illustrating a segmentation structure of a coding unit, in accordance with one embodiment of the present invention.

The encoder may split or divide one image or picture into a rectangular coding tree unit (CTU). Then, the encoder may sequentially encode CTUs one by one according to a raster scan order.

For example, the size of the CTU may be set to 64×64, 32×32, or 16×16. However, the present invention is not limited thereto. The encoder may select the size of the CTU based on a resolution of the input image or characteristics of the input image, etc. The CTU may include a coding tree block (CTB) for a luma component and a coding tree block (CTB) for corresponding two chroma components.

A single CTU may be decomposed into a quad tree (hereinafter referred to as a "QT") structure. For example, one CTU may be divided into four units, each one having a square shape, with a length of each side thereof decreasing by one half. This decomposition or division of the QT structure may be performed recursively.

Referring to FIG. 3, a root node of the QT may be related to the CTU. The QT may be partitioned until a leaf node is reached. In this case, the leaf node may be referred to as a coding unit (CU).

The CU may refer to a base unit for a coding process of the input image, for example, a base unit for intra/inter-predictions. The CU may include a CB for a luma component and a CB for two chroma components corresponding to the luma component. For example, the size of the CU may be set to 64×64, 32×32, 16×16, or 8×8. However, the present invention is not limited thereto. In the case of a high-resolution image, the size of the CU may be increased or varied.

Referring to FIG. 3, the CTU may correspond to the root node, and may have the smallest depth (that is, level 0). Depending on the characteristics of the input image, the CTU may not be divided. In this case, the CTU corresponds to the CU.

The CTU may be decomposed into a QT form. As a result, sub-nodes, each having a depth of level 1, may be generated. Among the sub-nodes, each having a depth of level 1, a sub-node (i.e., a leaf node) that is not further divided corresponds to a CU. For example, in FIG. 3(b), each of the coding units CU(a), CU (b), and CU (j) corresponding to nodes a, b and j respectively are partitioned one time in the CTU and thus has a depth of level 1.

Among the sub-nodes, each having a depth of level 1, at least one sub-node may be further split in a QT form. Among the sub-nodes, each having a depth of level 2, a sub-node (i.e., a leaf node) that is not further divided corresponds to a CU. For example, in FIG. 3(b), each of the coding units CU(c), CU (h), and CU (i) corresponding to nodes c, h and i respectively are partitioned two times in the CTU and thus has a depth of level 2.

Further, among the sub-nodes, each having a depth of level 2, at least one sub-node may be further split in a QT form. Among the sub-nodes, each having a depth of level 3, a sub-node (i.e., a leaf node) that is not further divided corresponds to a CU. For example, in FIG. 3(b), each of the coding units CU(d), CU (e), CU(f) and CU (g) corresponding to nodes d, e, f and g respectively are partitioned three times in the CTU and thus has a depth of level 3.

The encoder may determine a maximum or minimum size of the CU based on the characteristics (e.g., resolution) of the video image or the efficiency of coding. Information on the maximum or minimum size and/or information used for deriving the maximum or minimum size may be included in the bit stream. Hereinafter, a CU having a maximum size may be referred to as the largest coding unit (LCU), while a CU having a minimum size may be referred to as the smallest coding unit (SCU).

In addition, a CU having a tree structure may have predetermined maximum depth information (or maximum level information) and may be hierarchically divided. Further, each divided CU may have depth information. The depth information indicates the number and/or degree of divisions of the CU. Thus, the depth information may include information about the size of the CU.

The LCU is divided into a QT form. Therefore, the size of the SCU may be obtained using the LCU size and the maximum depth information of the tree. Conversely, the size of the SCU and the maximum depth information of the tree may be used to determine the size of the LCU.

For a single CU, information indicating whether or not the CU is divided may be transmitted to the decoder. For example, the information may be defined as a split flag and may be represented by a syntax element "split_cu_flag". The split flag may be included in all CUs except a SCU. For example, when the value of the split flag is "1", the corresponding CU is further divided into four CUs. When the value of the split flag is "0", the corresponding CU is not further divided, and, then, the coding process for the corresponding CU may be performed.

Although, in the embodiment as shown in FIG. 3, the QT structure described above is applied to the CU division by way of example, the QT structure described above may be equally applied to TU (transform unit) division, where the TU is a base unit for performing transform.

The TU may be hierarchically partitioned from the CU to be coded into a QT structure. For example, the CU may correspond to a root node of the tree for the transform unit TU.

The TU is divided into a QT structure. Thus, each of TUs divided from the CU may be further divided into smaller sub-TUs. For example, the size of the TU may be set to 32×32, 16×16, 8×8, or 4×4. However, the present invention is not limited thereto. For high-resolution images, the size of the TU may be larger or may vary.

For a single TU, information indicating whether or not the TU is divided may be transmitted to the decoder. For example, the information may be defined as a split transform flag and may be represented by a syntax element "split_transform_flag."

The split transform flag may be included in all TUs except the smallest TU (STU). For example, when the value of the split transform flag is "1", the corresponding TU is further divided into four TUs. When the value of the split transform flag is "0", the corresponding TU is not further divided, and, then, the coding process for the corresponding TU may be performed.

As described above, CU is a base unit for the coding process in which the intra-prediction or inter-prediction is performed. In order to more effectively code the input image, the CU may be divided into PUs (Prediction Units).

A PU is a base unit forming a prediction block. It is possible to generate different prediction blocks on the PU basis even within a single CU. The PU may be differently divided depending on whether an intra-prediction mode or an inter-prediction mode is used as a coding mode for a CU to which the PU belongs.

Figure 4:
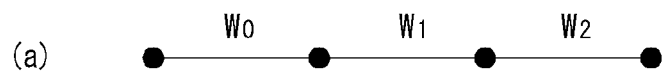
FIG. 4 is a diagram for illustrating a process of obtaining a graph-based transform matrix based on a one-dimensional graph and a two-dimensional graph according to one embodiment of the present invention.
Figure 4:
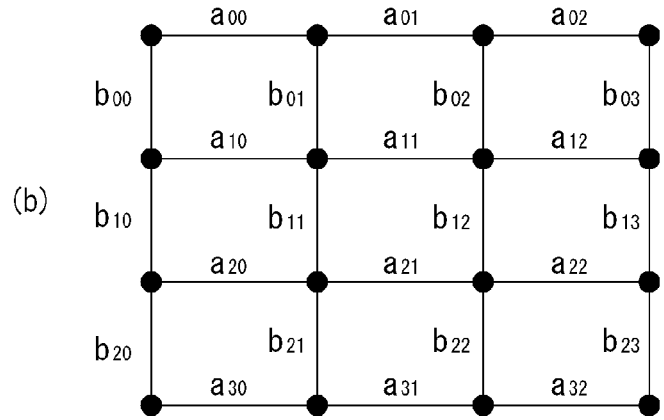

FIG. 4 is a diagram for illustrating a process of obtaining a graph-based transform matrix based on a one-dimensional graph and a two-dimensional graph according to one embodiment of the present invention.

In an embodiment of the present invention, graph types that may be used for processing a pixel block in an image may be described with reference to FIG. 4. For example, FIG. 4(a) shows a one-dimensional graph corresponding to each line of the pixel bloc, and FIG. 4(b) shows a two-dimensional graph corresponding to the pixel block.

A graph vertex may be associated with each pixel in the pixel block, and a value of the graph vertex may be represented by a pixel value. Further, a graph edge may refer to a line connecting the graph vertexes. The graph edge may be used to indicate what form statistical dependence in the signal has. A value representing an intensity of the statistical dependence may be called an edge weight.

For example, referring to FIG. 4(a) which indicates the one-dimensional graph, 0, 1, 2, and 3 represent positions of the vertexes respectively, and w0, w1, and w2 represent weights of edges between the vertexes respectively. Referring to FIG. 4(b) which indicates the two-dimensional graph, aij (i=0, 1, 2, 3, j=0, 1, 2) and bkl (k=0, 1, 2, l=0, 1, 2, 3) represent weights of edges between the vertexes respectively.

Each vertex may be connected to any other vertexes. An edge weight of zero may be assigned to an edge that connects non-associated or weakly-associated vertices. However, for simplicity of presentation, an edge with the edge weight of zero may be completely eliminated.

In an embodiment of the present invention, a transform obtained from a graph signal may be defined as a graph-based transform (hereinafter, 'GBT'). For example, provided that the relationship information between pixels constituting a TU is represented by a graph, the transform obtained from this graph may be referred to as the GBT.

The relationship information between the pixels may be defined in various ways. For example, the relationship information between the pixels may be defined based on similarities among pixel values of the pixels, based on whether the pixels belong to the same PU, based on whether the pixels belong to the same object, and the like. The inter-pixel relationship information may be defined based on edge presence/absence between the pixels and edge weight values between the pixels when each of the pixels is matched to the vertex of the graph In this case, the GBT may be obtained through a following process. For example, the encoder or decoder may obtain graph information from a target block in a video signal. From the obtained graph information, a Laplacian matrix L may be obtained using Equation 1:

$$L = D - A \qquad \text{[Equation 1]}$$

wherein D indicates a diagonal matrix, and A indicates an adjacency matrix.

The Laplacian matrix L may be subjected to eigen decomposition expressed into Equation 2 to obtain a GBT kernel:

$$L = U \Lambda U^T \qquad \text{[Equation 2]}$$

wherein L indicates a Laplacian matrix, U indicates an eigen matrix, and $U^T$ indicates a transpose matrix. In Equation 2, the eigen matrix U may provide a graph-based Fourier transform that is specific to a signal matching a corresponding graph model. For example, the eigen matrix U, which satisfies the equation 2, may mean a GBT kernel.

Figure 5:
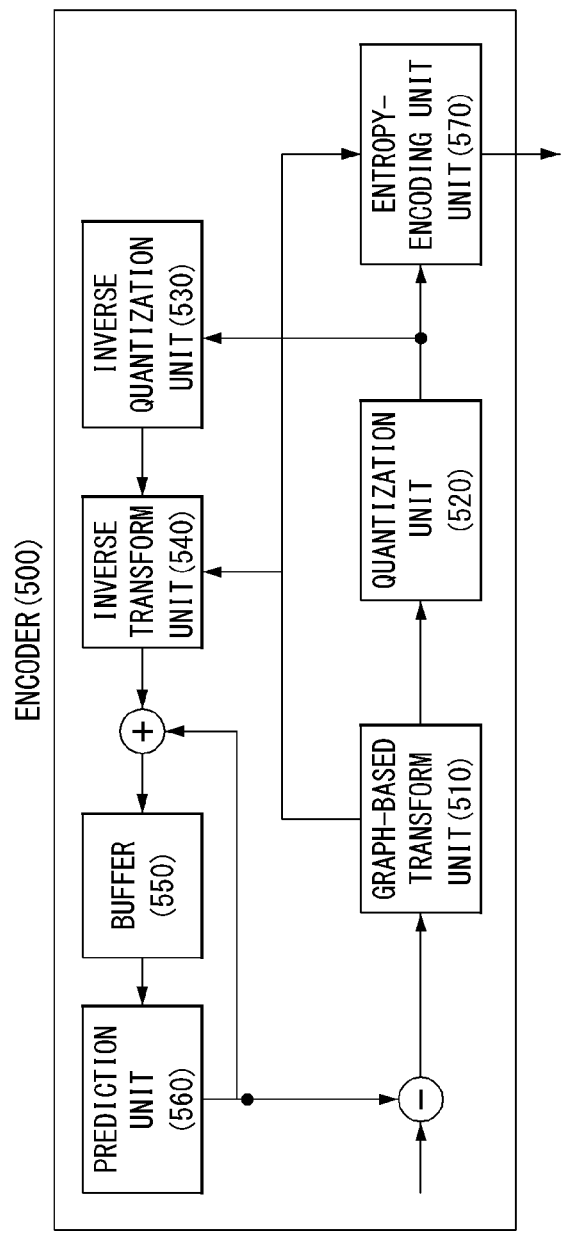
FIG. 5 illustrates a schematic block diagram of an encoder that processes graph-based signals according to an embodiment of the present invention.

FIG. 5 is an embodiment to which the present invention is applied and illustrates a schematic block diagram of an encoder processing a graph-based signal.

Referring to FIG. 5, to which the present invention is applied the encoder 500 includes a graph-based transform unit 510, a quantization unit 520, an inverse quantization unit 530, an inverse transform unit 540, a buffer 550, a prediction unit 560, and an entropy encoding unit 570.

The encoder 500 receives a video signal and generates a residual signal by subtracting a predicted signal output by the prediction unit 560 from the video signal. The generated residual signal is transmitted to the graph-based transform unit 510. The graph-based transform unit 510 generates a transform coefficient by applying a transform method to the residual signal.

The graph-based transform unit 510 may generate graphs from the residual signal and generate an optimal graph and an optimal transform by combining the graphs based on an optimization process. Furthermore, the graph-based transform unit 510 may perform a transform for the residual signal based on the optimal graph and the optimal transform.

In order to perform an optimization process, the graph-based transform unit 510 may first determine a common graph transform indicative of an optimal graph transform for a given set of graph Laplacian matrices, may determine a common graph frequency based on the common graph transform, and may then determine an optimal graph Laplacian matrix using a maximum likelihood function based on the common graph transform and the common graph frequency. The graph-based transform unit 510 may generate a graph-based transform kernel (GBT kernel) based on the optimal graph Laplacian matrix and perform a transform using the GBT kernel.

In one embodiment, the optimal transform may be a non-separable transform and may be orthonormal.

In one embodiment, the optimal transform may be transmitted to the decoder, but the present invention is not limited thereto. The optimal transform may be derived from the decoder. For example, an optimal graph Laplacian matrix may be transmitted to the decoder, and the optimal transform may be derived from the optimal graph Laplacian matrix.

In one embodiment, the optimal graph may have been determined based on an intra prediction mode used in the residual block.

In one embodiment, the graphs may have been obtained using edge information of the residual block.

In another embodiment, the graph-based transform unit 510 may generate at least one data cluster for video data, may generate at least one graph Laplacian matrix corresponding to the at least one data cluster, and may generate an optimized transform matrix by performing a transform optimization based on multiple graph-based models including the at least one graph Laplacian matrix. In this case, graphs corresponding to the multiple graph-based models may be generated through the following embodiments.

In another embodiment, in order to use the statistical characteristics of a residual signal, a GBT template set that is adaptive and has low complexity may be used. The terms, such as a GBT template, a graph template, a template graph, a GBT template set, a graph template set and a template graph set used in this specification, are common terms selected to describe the present invention and thus may be properly substituted and construed in each coding process.

In another embodiment, the graph-based transform unit 510 may extract a graph parameter within a graph corresponding to the target unit of a residual signal. For example, the graph parameter may include at least one of a vertex parameter and an edge parameter. The vertex parameter may include at least one of a vertex location and a vertex number, and the edge parameter may include at least one of an edge weight value and an edge weight number. Furthermore, the graph parameter may be defined as a specific number of sets. For example, the edge parameter set may be defined as a weight matrix.

In another embodiment, the graph-based transform unit 510 may generate a graph based on the extracted graph parameter and may set the generated graph as a base template. This is hereinafter referred to as a base template graph. For example, the base template graph may be a uniformly weighted graph. In this case, this may be expressed as $G_{uni}$. The node of the graph corresponds to a pixel of a target unit, and all of the edge weights of the target unit may be set as $W_{uni}$.

Furthermore, in the present invention, T different graphs may be generated by adjusting the edge weight set of the base template graph. This is hereinafter referred to as a template graph set and may be expressed as in Equation 3.

$$\{\mathcal{G}_t\}_{t=1}^T \qquad \text{[Equation 3]}$$

Furthermore, in the present invention, a block-adaptive template graph may be generated by reducing the weight of edges around a corner within a transform block. For example, the edges around the corner within the transform block may be set as $W_{weak}$, that is, an edge weight smaller than the $W_{uni}$. In this case, $W_{weak}$ is called a weak edge weight.

Furthermore, in the present invention, complexity can be reduced by making the edges around the corner within the transform block have the same weak edge weight ($W_{weak}$) value.

Furthermore, the present invention provides a method of selecting T different graphs as a template graph set in order to adaptively apply signal characteristics depending on different locations of residual blocks. Furthermore, the present invention may obtain a GBT through the spectral decomposition of the selected template graph set.

The quantization unit 520 quantizes the generated transform coefficient and transmits the quantized coefficient to the entropy encoding unit 570.

The entropy encoding unit 570 performs an entropy coding for the quantized signal and outputs an entropy-coded signal.

The quantized signal output by the quantization unit 520 may be used to generate a prediction signal. For example, the inverse quantization unit 530 and the inverse transform unit 540 within the loop of the encoder 500 may perform an inverse quantization and an inverse transform for the quantized signal so that the quantized signal is reconstructed as a residual signal. The reconstructed signal may be generated by adding the reconstructed residual signal to a prediction signal output by the prediction unit 560.

The buffer 550 stores the reconstructed signal for the future reference of the prediction unit 560.

The prediction unit 560 may generate a prediction signal using the signal previously reconstructed and stored in the buffer 550. In such a case, the present invention relates to efficiently predicting an area within a target image using an area within an anchor image. In this case, the anchor image may mean a reference image, a reference picture or a reference frame. Efficiency may be determined by calculating an average square error that quantizes a rate-distortion cost or distortion within a residual signal.

Figure 6:
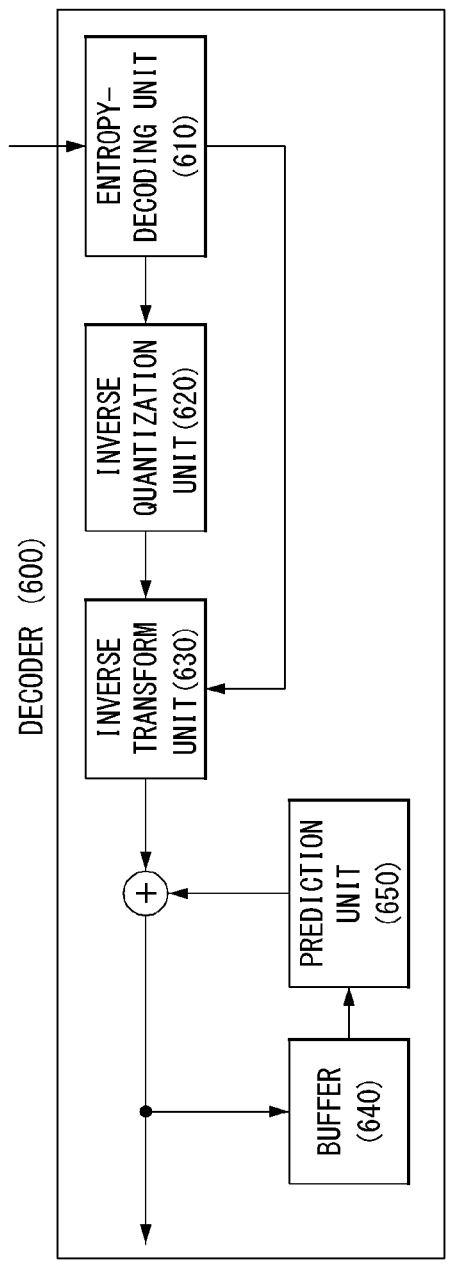
FIG. 6 illustrates a schematic block diagram of a decoder that processes graph-based signals according to an embodiment of the present invention.

FIG. 6 is an embodiment to which the present invention is applied and illustrates a schematic block diagram of a decoder processing a graph-based signal.

The decoder 600 of FIG. 6 receives a signal output by the encoder 500 of FIG. 5.

The entropy decoding unit 610 performs an entropy decoding for the received signal. The inverse quantization unit 620 obtains a transform coefficient from the entropy-decoded signal based on information about a quantization step size.

The inverse transform unit 630 obtains a residual signal by performing an inverse transform for the transform coefficient. In this case, the inverse transform may mean inverse transform for a graph-based transform obtained by the encoder 500. Furthermore, the graph-based transform matrix may have been generated based on an optimal graph. The optimal graph may have been generated by combining graphs based on an optimization process.

In another embodiment of the present invention, the inverse transform unit 630 may receive a template index indicative of a graph-based transform template and obtain a graph-based transform kernel corresponding to the template index. A transform unit may be reconstructed using the obtained graph-based kernel. In this case, the graph-based transform kernel may indicate a transform kernel optimized based on multiple graph-based models.

A reconstructed signal may be generated by adding the residual signal to a prediction signal output by the prediction unit 650.

The buffer 640 stores the reconstructed signal for the future reference of the prediction unit 650.

The prediction unit 650 generates a prediction signal based on a signal previously reconstructed and stored in the buffer 640.

Figure 7:
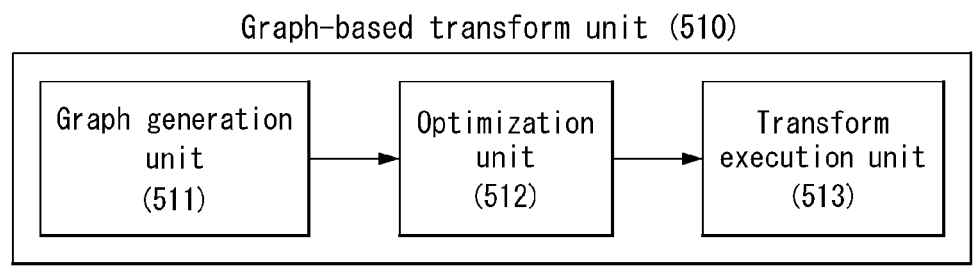
FIG. 7 is an embodiment to which the present invention is applied and shows a schematic internal block diagram of the graph-based transform unit performing a graph-based transform.

FIG. 7 is an embodiment to which the present invention is applied and shows a schematic internal block diagram of the graph-based transform unit performing a graph-based transform.

The present invention provides a new framework for combining multiple weighted graphs into a single optimization weighted graph. In this framework, statistical formulation for a graph combination is provided using a maximum likelihood criterion, and a method of deriving optimal conditions for common graph transform (CGT) estimation and common graph frequency (CGF) estimation is provided.

Accordingly, the present invention can provide better modeling compared to a commonly used averaged method, and may be applied to various applications in signal processing and machine learning.

In many data-oriented applications, graphs provide a common tool for modeling the relationships between data sources (or data points). With respect to such applications, a weighted graph may be used to express similarities between the data sources in which the nodes of the graph indicate sources. In this case, weighted edges indicate similarity between the weighted graphs.

In particular, if data is a high degree, multiple graphs may be used to describe general relationships between sources. For example, in a social network, a plurality of graphs may connect a plurality of people. In this case, each graph may be constructed based on different characteristics (e.g., friendship, political viewpoint and local location). In signal processing, multiple graphs may be used for the graphic modeling of a random signal having a mixed distribution (e.g., Gaussian mixed models).

The present invention is interested in a graph combination indicative of an optimal weighted graph from multiple weighted graphs. The graph combination may be useful in various cases. For example, if multiple graphic models are given with respect to signals (or data), an optimized aggregate model close to the original models from a viewpoint of metrics may be used. In particular, if a signal model is uncertain, to combine multiple candidate models may enable designing a robust model in modeling uncertainties. To use a single optimized model may also be advantageous from a viewpoint of computational complexity. Furthermore, a graph combination that summarizes data sets forming multiple graphs into a single graph may be used, and this is attractive to graph visualization in data analysis.

The present invention proposes a new framework for a graph combination. In this framework, there is proposed 2-step statistical formulation for a graph combining problem using a maximum likelihood criterion. In particular, (i) common graph transform (CGT) estimation and (ii) common graph frequency (CGF) estimation problems are defined, and optimal conditions therefor are derived. The present invention can formulate a decisive graph combining problem using resulting optimization conditions. Furthermore, an optimal combined graph can be obtained by first estimating the best CGT and then estimating the best CGF.

Meanwhile, a graph combination for improving the clustering and semi-supervised learning of each spectrum using multiple graphs may be performed, but this is based on the weighted average of the graphs and is not theoretically guaranteed.

Furthermore, the CGT estimation problem is related to common principal component (CPC) estimation whose object is to find a diagonal matrix that combines and diagonalizes multiple covariance matrices from a maximum likelihood viewpoint. A JADE algorithm may be introduced into combination diagonalization having a Frobenius norm criterion due to the CPC problem. In terms of an algorithm, a solution based on Jacobi-like iterations may be applied to the CGT estimation problem. Furthermore, the present invention may derive optimal conditions for the CGT estimation and obtain other metrics for optimization.

Referring to FIG. 7, the graph-based transform unit 510 may include a graph generation unit 511, an optimization unit 512 and a transform execution unit 513.

In order to describe the present invention, for convenience sake, in this specification, the function units are divided and described as in FIG. 7, but this is only an embodiment and the contents of the present invention should not be limited to the names of the function units and construed. For example, the following contents may be performed in any one of the function units, such as a transform unit, a graph-based transform unit and an optimization unit.

The graph-based transform unit 510 may extract a graph parameter within a graph corresponding to the target unit of a video signal or a difference signal. For example, the graph parameter may include at least one of a vertex parameter and an edge parameter. The vertex parameter may include at least one of a vertex location and a vertex number. The edge parameter may include at least one of an edge weight value and an edge weight number. Furthermore, the graph parameter may be defined as a specific number of sets.

The graph generation unit 511 may generate a graph based on the graph parameter. In this case, the graph may include multiple weighted graphs. For another example, the graph may include a weighted or not-weighted line graph. In this case, the line graph may be generated for each of the row and column of a target block.

The optimization unit 512 may generate an optimal graph by combining the multi-weighted graphs. In this case, the optimal graph may be expressed as a single optimized graph or a single optimized weighted graph.

Furthermore, the optimization unit 512 may generate or determine an optimal transform based on the optimal graph. In this specification, a transform may be substituted with an expression, such as a "transform matrix or transform kernel", and used.

In one embodiment, statistical formulation for a graph combination is provided using a maximum likelihood criterion.

In one embodiment, there is provided a method of deriving optimal conditions for common graph transform (CGT) estimation and common graph frequency (CGF) estimation.

In one embodiment, there is provided a method of determining an optimal combined graph by estimating the best common graph transform (CGT) and estimating the best common graph frequency (CGF).

For another example, the optimization unit 512 may generate an optimal graph and an optimal transform by combining the multi-weighted graphs.

For another example, the optimal transform may correspond to a value previously determined in the encoder and the decoder. In this case, the optimization unit 512 may derive a transform matrix corresponding to the optimal graph from the place where the transform matrix has been stored.

Graph Combination Framework

The present invention provides a method of combining undirected weighted graphs with no self-loops.

k graphs $\{\mathcal{G}_i(V,\varepsilon_i,W_i)\}_{i=1}^k$ having a fixed set of nodes v are given. In this case, $\mathcal{G}_i,\varepsilon_i$ is a set of edges, and $W_i$ indicates a weighted adjacency matrix having non-negative entries. If an edge is present between nodes j and l, the component of the j-th row and l-th column of $W_i$ is greater than 0 (i.e., $(W_i)_{jl}>0$). If not, $(W_i)_{jl}=0$. Since graphs are undirected, $W_i$ may be a symmetric matrix.

The graph $G_i$ may be characterized using a graph Laplacian matrix $L_i=D_i-W_i$. In this case, $D_i$ indicates the sum of weights of an edge in which a j-th diagonal component $(D_i)_{jj}$ is incident on the j-th node. With respect to an undirected graph $\mathcal{G}(V,\varepsilon,W)$ having d nodes, a corresponding (d×d) graph Laplacian matrix L is symmetric and positive semi-definite, and has a singular characteristic. Accordingly, they have a set of orthonormal eigen vectors of $\{u_j\}_{j=1}^d$. In this case, associated eigenvalues are $0=\lambda_1\leq\lambda_2\leq\ldots\leq\lambda_d$. With respect to connected graphs, only the first eigenvalue is equal to 0 (i.e., $0=\lambda_1<\lambda_2$), and a corresponding eigen vector is $u_1=(1/\sqrt{d})1$. In this case, "1" indicates a vector (all one vector of a size d) in which all of the components of a size d are 1. A diagonal graph transform matrix U and a diagonal graph frequency matrix Λ may be obtained by eigen decomposition of $L=U\Lambda U^t$.

In this case, all of the k graphs use the same node set v having the d nodes, each of the k graphs is a connected graph, and graph weights indicate similarity between the nodes.

Meanwhile, the transform execution unit 513 may perform a transform for the residual block based on the optimal transform.

For another example, the transform execution unit 513 may perform the transform on the residual block based on the optimal graph and the optimal transform.

Figure 8:
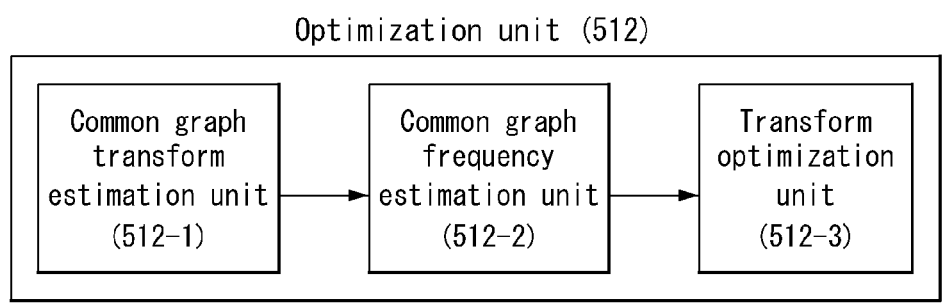
FIG. 8 is an embodiment to which the present invention is applied and shows a schematic internal block diagram of the optimization unit performing transform optimization.

FIG. 8 is an embodiment to which the present invention is applied and shows a schematic internal block diagram of the optimization unit performing a transform optimization.

The present invention propose 2-step statistical formulation for combining k graph Laplacian matrices $L_1,\ldots,L_k$ into an optimal a single graph Laplacian $\hat{L}=\hat{U}\hat{\Lambda}\hat{U}^t$ based on a maximum likelihood criterion.

In the first step, in order to find k frequency matrices $\{\Lambda_i\}_{i=1}^k$ associated with an optimal CGT($\hat{U}$) a common graph transform (CGT) estimation problem may be formulated.

In the second step, an optimal the frequency matrix $\hat{\Lambda}$ that combines the k frequency matrices $\{\Lambda_i\}_{i=1}^k$ associated with the optimal CGT($\hat{U}$) may be formulated.

In this case, CGT estimation is similar to the common principal component (CPC) problem that handles the optimization of an orthogonal matrix to combine and diagonalize multiple covariance matrices. This formulation is inherently different in the CGT problem because it is based on graph Laplacian matrices, and thus leads to different optimality conditions. First, a maximum likelihood criterion is described.

Maximum Likelihood Criterion

A maximum likelihood criterion for k graph Laplacians L1, L2, . . . , Lk may be derived as follows. With respect to i=1, 2, . . . , k, d-variate Gaussian random vectors $x_i\sim\mathcal{N}(0,L_i^+)$ may be independently distributed as in Equation 4.

$$p(x_i) = \frac{1}{(2\pi)^{n/2}|L_i^+|_+^{1/2}}\exp\left(-\frac{1}{2}x_i^t L_i x_i\right) \qquad \text{[Equation 4]}$$

In this case, |•|+ is a pseudo-determinant operator and $L_i^+$ is the pseudo-inverse of $L_i$. Since a random vector $X_i$ becomes a parameter by a graph Laplacian matrix $L_i$, it has a degenerate multivariate Gaussian distribution having singular covariance $L_i^+$. A sample covariance matrix indicated by $S_i$ may be obtained from $\tilde{n}_i=n_i+1$ ($n_i\geq d$) random samples of the distribution p(Xi) of Equation 4.

Thereafter, a corresponding scatter matrix $\tilde{S}_i=n_i S_i$ has a Wishart distribution $\tilde{S}_i\sim W(L_i^+,n_i)$, and this is a common data model used for covariance estimation. The present invention uses such a data model. In accordance with the law of large numbers, $S_i\rightarrow L_i^+$ in proportion to $n_i\rightarrow\infty$, and the likelihood function of $L_1, L_2, \ldots, L_k$ is shown in Equation 5.

$$p(\{\tilde{S}_i\}_{i=1}^k \mid \{L_i\}_{i=1}^k) = \prod_{i=1}^k C_i |L_i^+|_+^{-\frac{n_i}{2}} \exp\left(-\frac{n_i}{2} Tr(L_i S_i)\right) \quad \text{[Equation 5]}$$

In this case, $C_i$ is a constant not dependent on $L_i$. A negative log-likelihood objective function is Equation 6.

$$NLL(L_1, L_2, \ldots, L_k) = \sum_{i=1}^k n_i (\log|L_i^+|_+ + Tr(L_i S_i)) \quad \text{[Equation 6]}$$

Common Graph Transform (CGT) Estimation

Referring to FIG. 8, the optimization unit 512 may include a common graph transform estimation unit 512-1, a common graph frequency estimation unit 512-2, and a transform optimization unit 512-3.

The common graph transform estimation unit 512-1 may determine an optimal common graph transform CGT(Û). In this case, the optimal common graph transform CGT(Û) indicates an optimal graph transform for a given set of graph Laplacian matrices.

In order to find the optimal common graph transform CGT(Û), a CGT assumption may be defined as in Equation 7.

$$\mathcal{H}_{CGT}: L_i = U\Lambda_i U^t \text{ for } i=1,2,\ldots,k \quad \text{[Equation 7]}$$

In this case, U is an orthogonal matrix, and $\{\Lambda_i\}_{i=1}^k$ is a set of diagonal frequency matrices to be estimated. Such an assumption provides a greater degree of freedom in estimating U, and thus permits mutual frequency matrices. If the CGT assumption described in Equation 6 is valid, the NLL object in Equation 6 is Equation 8.

$$NLL(U, \{\Lambda_i\}_{i=1}^k) = \sum_{i=1}^k n_i (\log|\Lambda_i^+|_+ + Tr(\Lambda_i U^t S_i U)) \quad \text{[Equation 8]}$$

$\lambda_1^{(i)}=0$ for $i=1,\ldots,k$, $u_1=(1/\sqrt{d})$ is obtained according to the characteristics of graph Laplacian matrices, and thus Equation 8 may be simplified into Equation 9.

$$NLL(\tilde{U}, \tilde{\lambda}) = \sum_{i=1}^k n_i \sum_{j=2}^d (\log(1/\lambda_j^{(i)}) + \lambda_j^{(i)} u_j^t S_i u_j) \quad \text{[Equation 9]}$$

In this case, $U_j$ is the j-th column of U, $\lambda_j^{(i)}$ is the (i,j)-th entry of $\Lambda_i$, and $\tilde{U}$ and $\tilde{\lambda}$ indicate $\{u_j\}_{j=2}^d$ and $\{\lambda_2^{(i)},\ldots,\lambda_d^{(i)}\}_{i=1}^k$, respectively. Accordingly, the maximization of the likelihood function of Equation 5 under the assumption $\mathcal{H}_{CGT}$ may be expressed as in Equation 10.

$$\underset{\tilde{U},\tilde{\lambda}}{\text{minimize}} \sum_{i=1}^k n_i \sum_{j=2}^d (-\log(\lambda_j^{(i)}) + \lambda_j^{(i)} u_j^t S_i u_j) \quad \text{[Equation 10]}$$

$$\text{subject to } u_l^t u_j = \begin{cases} 1 & l=j \\ 0 & l \neq j \end{cases}$$

The optimization problem in Equation 10 is non-convex attributable to its own orthogonality constraints. Accordingly, required conditions for local optimization are derived using the Lagrange multiplier theory. The Lagrange function in Equation 10 is Equation 11.

$$\mathcal{L}(\tilde{U}, \tilde{\lambda}, \mu) = NLL(\tilde{U}, \tilde{\lambda}) + \sum_{l=2}^d \mu_l(u_l^t u_l - 1) + 2 \sum_{2 \leq l < j \leq d} \mu_{l,j} u_l^t u_j \quad \text{[Equation 11]}$$

In this case, μ indicates Lagrange multipliers $\{\mu_l\}_{l=2}^d$ and $\{\mu_{l,j}\}_{2 \leq l < j \leq d}$. The last summation term of Equation 11 is simplified using symmetry between multipliers ($\mu_{l,j}=\mu_{j,l}$). Equations 12 and 13 may be obtained by adopting partial derivatives for primal variables ($\tilde{U},\tilde{\lambda}$) and adopting an equation as 0.

$$\frac{\partial \mathcal{L}(\tilde{U}, \tilde{\lambda}, \mu)}{\partial \lambda_j^{(i)}} = \sum_{i=1}^k n_i \left(-\frac{1}{\lambda_j^{(i)}} + u_j^t S_i u_j\right) = 0 \quad \text{[Equation 12]}$$

$$\frac{\partial \mathcal{L}(\tilde{U}, \tilde{\lambda}, \mu)}{\partial u_j} = \sum_{i=1}^k 2n_i \lambda_j^{(i)} S_i u_j + 2\mu_j u_j + 2 \sum_{2 \leq l < j \leq d} \mu_{l,j} u_l = 0 \quad \text{[Equation 13]}$$

If Equation 13 is multiplied by $u_j^t$ from the left side, Equation 14 may be obtained.

$$\sum_{i=1}^k 2n_i \lambda_j^{(i)} u_j^t S_i u_j + 2\mu_j = 0 \quad \text{[Equation 14]}$$

Equation 15 may be obtained by reorganizing Equation 12.

$$1/\lambda_j^{(i)} = u_j^t S_i u_j \quad \text{[Equation 15]}$$

In this case, Equation 16 may be derived by substituting $u_j^t S_i u_j$ with $1/\lambda_k^{(i)}$ in Equation 14.

$$\mu_j = -\sum_{i=1}^k n_i \text{ for } j=2,\ldots,d \quad \text{[Equation 16]}$$

If Equation 13 is multiplied by $(\frac{1}{2})u_h^t$ from the left side, Equation 17 may be obtained.

$$\sum_{i=1}^k n_i \lambda_j^{(i)} u_h^t S_i u_j + \mu_{h,j} = 0 \quad \text{[Equation 17]}$$

$$j=2,\ldots,d, h \neq j$$

In this case, if h and j indices are exchanged, Equation 18 may be obtained.

$$\sum_{i=1}^k n_i \lambda_h^{(i)} u_j^t S_i u_h + \mu_{j,h} = 0 \quad h=2,\ldots,d, j \neq h \quad \text{[Equation 18]}$$

Optimal conditions for common graph transform estimation may be obtained as in Equation 19 by subtracting Equation 18 from Equation 17.

$$u_h^t \left( \sum_{i=1}^{k} n_i (\lambda_j^{(i)} - \lambda_h^{(i)}) S_i \right) u_j = 0$$ [Equation 19]

$$j, h = 2, \ldots, d, j \neq h$$

In this case, according to Equation 15, $\lambda_j^{(i)} = 1/(u_j^t S_i u_j)$ and $\lambda_h^{(i)} = 1/(u_h^t S_i u_h)$.

Accordingly, the common graph transform estimation unit 512-1 may determine an optimal common graph transform CGT($\hat{U}$) based on Equation 19, that is, optimal conditions.

Common Graph Frequency (CGF) Estimation

The common graph frequency estimation unit 512-2 may determine a common graph frequency based on a common graph transform.

First, in order to find an optimal common graph frequency CGF($\hat{\Lambda}$) a CGF assumption may be defined as in Equation 20.

$$\mathcal{H}_{CGF}: L_i = \hat{U} \Lambda \hat{U}^t \text{ for } i=1,2,\ldots,k \quad [\text{Equation 20}]$$

In this case, $\hat{U}$ indicates an optimal solution for the CGT problem in Equation 10. $\Lambda = \text{diag}([\lambda_1, \ldots, \lambda_d])$ is a diagonal matrix to be estimated. NLL($L_1, L_2, \ldots, L_k$) = NLL($\Lambda$) in Equation 6 may be written as in Equation 21 by adding $\mathcal{H}_{CGF}$.

$$NLL(\Lambda) = \sum_{i=1}^{k} n_i \left( \log|\Lambda^+|_+ + \text{Tr}(\Lambda \hat{U}^t S_i \hat{U}) \right)$$ [Equation 21]

Since the first eigenvalue of a graph Laplacian matrix is 0, Equation 21 may be simplified as in Equation 22.

$$NLL(\lambda_2, \ldots, \lambda_d) = \sum_{i=1}^{k} n_i \sum_{j=2}^{d} (\log(1/\lambda_j) + \lambda_j \hat{u}_j^t S_i \hat{u}_j)$$ [Equation 22]

$\hat{u}_j$ is the j-th column of $\hat{U}$, and $\lambda_j$ is the (j, j)-th entry of $\Lambda$. Equation 23 is obtained by taking the derivative of Equation 22 with respect to $\lambda_j$ and taking an equation as 0.

$$\frac{\partial NLL(\lambda_2, \ldots, \lambda_d)}{\partial \lambda_j} = \sum_{i=1}^{k} n_i \left( -\frac{1}{\lambda_j} + \hat{u}_j^t S_i \hat{u}_j \right) = 0$$ [Equation 23]

Since $1/\lambda_j^{(i)} = \hat{u}_j^t S_i \hat{u}_j$ is obtained from Equation 15, optimal conditions for common graph frequency estimation may be written as in Equation 24.

$$\frac{1}{\lambda_j} = \frac{\sum_{i=1}^{k} n_i / \lambda_j^{(i)}}{\sum_{i=1}^{k} n_i} \quad j = 2, 3, \ldots, d.$$ [Equation 24]

In this case, a common graph frequency is $\hat{\Lambda} = \text{diag}([0, \lambda_2, \ldots, \lambda_d])$.

Accordingly, the common graph frequency estimation unit 512-2 may determine a common graph frequency $\hat{\Lambda} = \text{diag}([0, \lambda_2, \ldots, \lambda_d])$ that satisfies Equation 24 based on a common graph transform.

Graph Combining

An embodiment of the present invention provides a method of combining k graphs $L_1, \ldots, L_k$. The method may have sample-related terms) $n_i$ (the number of samples collected from $p(x_i)$ and Si (a sample covariance for $L_i^+$) as factors.

The present invention may provide the final formulation based on the optimal conditions described in Equation 19 and Equation 24. To this end, in Equation 19, the sample covariance $S_i$ may be substituted with an accurate covariance $L_i^+$. Since $L_i^+$ is not dependent on $n_i$, ni=c may be selected as integer, that is, c>0. Accordingly, the $n_i$ element may be removed from Equation 19 and Equation 24.

Furthermore, if $\hat{L} = \hat{U}\hat{\Lambda}\hat{U}^t$ maximizes Equation 5 under assumptions given by $\mathcal{H}_{CGT}$ and $\mathcal{H}_{CGF}$, the optimal conditions described in Equations 19 and 24 may be satisfied. However, in general, such assumptions are not valid. In particular, with respect to a given set of graph Laplacian matrices, orthogonal matrices satisfying $\mathcal{H}_{CGT}$ may not be present. Accordingly, an optimal common graph transform may be approximated. In order to approximate the optimal common graph transform, the minimization problem of Equation 25 may be solved based on the optimal conditions in Equation 19.

$$\underset{u_h, u_j}{\text{minimize}} \; u_h^t \left( \sum_{i=1}^{k} (\lambda_j^{(i)} - \lambda_h^{(i)}) L_i^+ \right) u_j \quad j, h = 2, \ldots, d$$ [Equation 25]

$$\text{subject to } u_h^t u_j = \begin{cases} 1 & h = j \quad \lambda_j^{(i)} = 1/(u_j^t L_i^+ u_j) \\ 0 & h \neq j \quad \lambda_h^{(i)} = 1/(u_h^t L_i^+ u_h) \end{cases}$$

This indicates a non-convex problem attributable to orthogonality constraints. An embodiment of the present invention provides an iterative algorithm that guarantees convergence into a local optimal solution for CGT.

The optimal condition in Equation 24 may be simplified as in Equation 26 by changing $n_i$ into a constant c with respect to the common graph frequency estimation.

$$\frac{1}{\lambda_j} = \frac{1}{k} \sum_{i=1}^{k} \frac{1}{\lambda_j^{(i)}} = \frac{1}{k} \sum_{i=1}^{k} \hat{u}_j^t L_i^+ \hat{u}_j \quad j = 2, 3, \ldots, d$$ [Equation 26]

In this case, $\hat{u}_j$ indicates the j-th column of an optimal CGT matrix $\hat{U}$. Basically, such conditions provide an average of frequency estimations obtained by solving the optimization problem of Equation 25. However, since the assumptions $\mathcal{H}_{CGT}$ and $\mathcal{H}_{CGF}$ are not commonly valid, a frequency matrix $\hat{\Lambda} = \text{diag}([0, \lambda_2, \ldots, \lambda_d])$ cannot generate a graph Laplacian matrix using $\hat{U}\hat{\Lambda}\hat{U}^t$. Accordingly, the present invention proposes searching for the closest graph Laplacian matrix $\hat{U}\hat{\Lambda}\hat{U}^t$ from a maximum likelihood viewpoint. Finally, the convex optimization problem may be formulated as in Equation 27.

$$\underset{L(\Gamma)}{\text{maximize}} \; \log|M|_+ - \text{Tr}(M\hat{\Lambda}^+)$$ [Equation 27]

$$\text{subject to } M = \hat{U}^t(L(\Gamma))\hat{U}$$

$L(\Gamma) :=$ graph Laplacian matrix

In this case, $L(\Gamma)$ is restricted to a graph Laplacian matrix having an edge set $\Gamma$ (i.e., graph connectivity). An optimal common graph transform $\hat{U}$ may be obtained by solving Equation 25, and an optimal common graph frequency $\hat{\Lambda}$ satisfies Equation 26. The $\Gamma$ parameter enables specifying graph connectivity information and may be previously defined. For another example, the $\Gamma$ parameter may be selected as a set including all of possible edges.

The present invention provides an algorithm, such as Table 1, in order to find an optimal graph Laplacian matrix $L^*$ that combines the k graph Laplacian matrices $\{L_i\}_{i=1}^k$.

TABLE 1

| | function GRAPH COMBINING($\{L_i\}_{i=1}^k$, $U_{init}$, $\Gamma$, $\epsilon$) |
|---|---|
| S1 | $\hat{U} \leftarrow$ CGTA($\{L_i\}_{i=1}^k$, $U_{init}$, $\epsilon$) |
| S2 | $\hat{\Sigma} \leftarrow \frac{1}{k}\sum_{i=1}^{k} \hat{U}' L_i^+ \hat{U}$ |
| S3 | $\hat{\lambda}_1 \leftarrow 0$ $\{\hat{\lambda}_j\}_{j=2}^d \leftarrow \{1/(\hat{\Sigma})_{jj}\}_{j=2}^d$ |
| S4 | $\{(\hat{\Lambda})_{jj}\}_{j=1}^d \leftarrow \{\hat{\lambda}_j\}_{j=1}^d$ |
| S5 | Obtain from Equation 27 using $L^* \leftarrow$ parameters $\hat{U}$, $\hat{\Lambda}$ and $\Gamma$ |
| | return $L^*$ |
| | end function |

Referring to Table 1, in order to find the optimal graph Laplacian matrix $L^*$, first, the optimization problem described in Equation 25 is to be solved to find the optimal common graph transform $\hat{U}$ (S1). Thereafter, the optimal common graph frequency $\hat{\Lambda}$ may be estimated using the conditions described in Equation 26 (S2 to S4).

Finally, the optimal graph Laplacian matrix $L^*$ may be obtained by solving the optimization problem of Equation 27. In this case, the optimal common graph transform $\hat{U}$, the common graph frequency $\hat{\Lambda}$, and the edge set $\Gamma$ may be used.

Meanwhile, the graph combination algorithm may fetch a common graph transform algorithm (CGTA), such as Table 2, in order to search the optimal common graph transform $\hat{U}$.

TABLE 2

| | function CGTA($\{L_i\}_{i=1}^k$, $U_{init}$, $\epsilon$) |
|---|---|
| S1 | $U \leftarrow U_{init}$ |
| | do |
| | $\quad U_{pre} \leftarrow U$ |
| S2 | $\quad$ for all $(h, j)$ pairs such that $2 \leq h, j \leq d$ and $h \neq j$ do |
| | $\quad\quad u_h \leftarrow U(:, h)$ $u_j \leftarrow U(:, j)$ |
| | $\{A_i\}_{i=1}^k \leftarrow \left\{\begin{bmatrix} u_h' L_i^+ u_h & u_h' L_i^+ u_j \\ u_j' L_i^+ u_h & u_j' L_i^+ u_j \end{bmatrix}\right\}_{i=1}^k$ |
| S3 | $\quad\quad R \leftarrow$ BEST ROTATION($\{A_i\}_{i=1}^k$, $\epsilon$) |
| S4 | $\quad\quad V \leftarrow [u_h, u_j]R$ |
| S5 | $\quad\quad U(:, h) \leftarrow V(:, 1)$ $U(:, j) \leftarrow V(:, 2)$ |
| | do |
| S6 | while $\|U - U_{pre}\|_F \geq \epsilon$ (stopping criterion) |
| | return $U$ |
| | end function |
| S7 | function BEST ROTATION($\{A_i\}_{i=1}^k$, $\epsilon$ |
| S8 | $Q \leftarrow I$ |
| | do |
| | $\quad Q_{pre} \leftarrow Q$ $T \leftarrow 0$ |
| | $\quad q_1 \leftarrow Q(:, 1)$ $q_2 \leftarrow Q(:, 2)$ |
| | $\quad$ for $i = 1 : k$ do |
| | $\quad\quad \delta_1^{(i)} \leftarrow 1/(q_1' A_i q_1)$ $\delta_2^{(i)} \leftarrow 1/(q_2' A_i q_2)$ |
| | $\quad\quad T \leftarrow T + (\delta_1^{(i)} - \delta_2^{(i)})A_i$ |
| | $\quad$ end for |

TABLE 2-continued

| | function CGTA($\{L_i\}_{i=1}^k$, $U_{init}$, $\epsilon$) |
|---|---|
| | $\theta \leftarrow \frac{1}{2}\arctan\left(\frac{T(1, 2)}{T(1, 1) - T(2, 2)}\right)$ |
| | $Q \leftarrow \begin{bmatrix} \cos(\theta) & -\sin(\theta) \\ \sin(\theta) & \cos(\theta) \end{bmatrix}$ |
| | while $\|Q - Q_{pre}\|_F \geq \epsilon$ (stopping criterion) |
| | return $Q$ |
| | end function |

Referring to Table 2, there is proposed the common graph transform algorithm (CGTA) in order to solve the non-convex optimization problem of Equation 25.

First, an initial guess $U_{init}$ may be given (S1). With respect to the given initial guess $U_{init}$ and an error tolerance $\epsilon$, the common graph transform algorithm (CGTA) iteratively performs the minimization process of Equation 25 by updating the columns of U in pairs (S2). "for loop" in step S2 may be iterated until $\epsilon$-convergence is reached with respect to all of (h, j), that is, h,j=2, . . . , d and h≠j (S6).

In every iterative process, an optimal (2×2) rotation matrix may be used to update the uh and uj vectors of U (S3 to S5). In this case, in order to find the optimal rotation matrix, another iterative procedure such as step S7 may be used. The algorithm of S7 to S8 guarantees convergence into a local optimal solution, but convergence analysis is omitted due to a space limitation.

The transform optimization unit 512-3 may obtain an optimal graph Laplacian matrix $L^*$ that combines the graph Laplacian matrices $\{L_i\}_{i=1}^k$ through such a process. The transform optimization unit 512-3 may obtain an optimal transform kernel based on the optimal graph Laplacian matrix $L^*$. The optimal transform kernel may be used for a transform on a residual block.

Meanwhile, in this specification, combining graphs may be construed as including combining graph Laplacian matrices.

Figure 9:
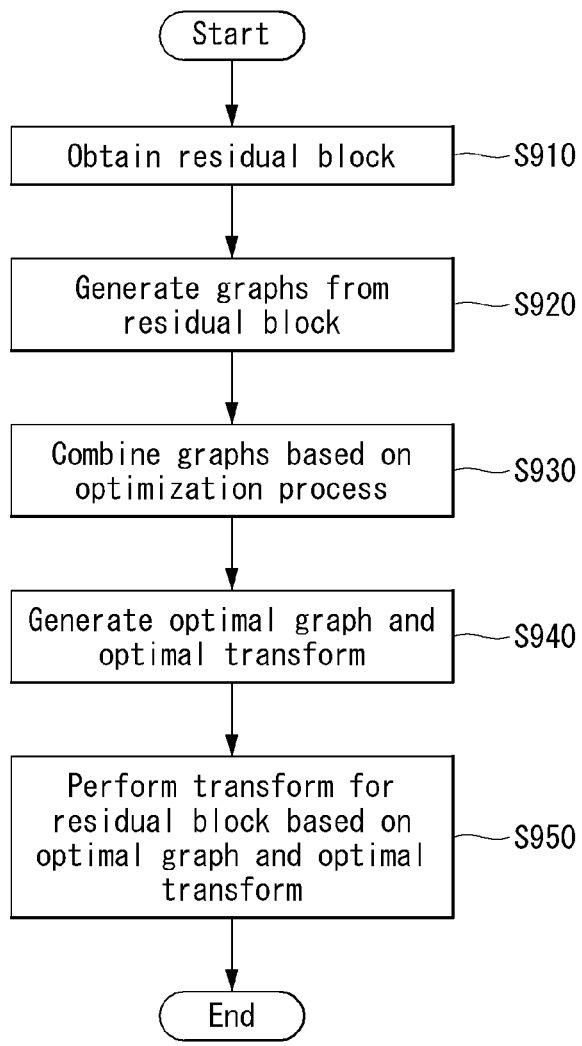
FIG. 9 is an embodiment to which the present invention is applied and shows a flowchart for illustrating a method of encoding a video signal using a single optimized graph.

FIG. 9 is an embodiment to which the present invention is applied and shows a flowchart for illustrating a method of encoding a video signal using a single optimized graph.

The present invention provides a method of determining an optimal combined graph by estimating the best common graph transform (CGT) and then estimating the best common graph frequency (CGF).

First, the encoder may obtain a residual block by subtracting a prediction signal from the original signal (S910).

The encoder may generate graphs from the residual block (S920).

In one embodiment, the graphs may have been obtained using edge information of the residual block.

The encoder may generate an optimal graph and an optimal transform (S940) by combining the graphs (S930). In this case, the graphs may be combined based on an optimization process, and the optimization process is described in detail in FIG. 10.

In one embodiment, the algorithm of Table 1 may be applied to the process of combining the graphs. Accordingly, the encoder may obtain an optimal graph Laplacian matrix. In this case, Equation 27 may be used to obtain the optimal graph Laplacian matrix. Furthermore, the encoder may generate an optimal transform using the optimal graph Laplacian matrix.

In one embodiment, the optimal transform may be a non-separable transform and may be orthonormal.

In one embodiment, the optimal transform may be transmitted to the decoder, but the present invention is not limited thereto. The optimal transform may be derived from the decoder. For example, the optimal graph Laplacian matrix may be transmitted to the decoder, and the optimal transform may be derived from the optimal graph Laplacian matrix.

In one embodiment, the optimal graph may have been determined based on an intra prediction mode used in the residual block.

The encoder may perform a transform for the residual block based on the optimal graph and the optimal transform (S950).

Figure 10:
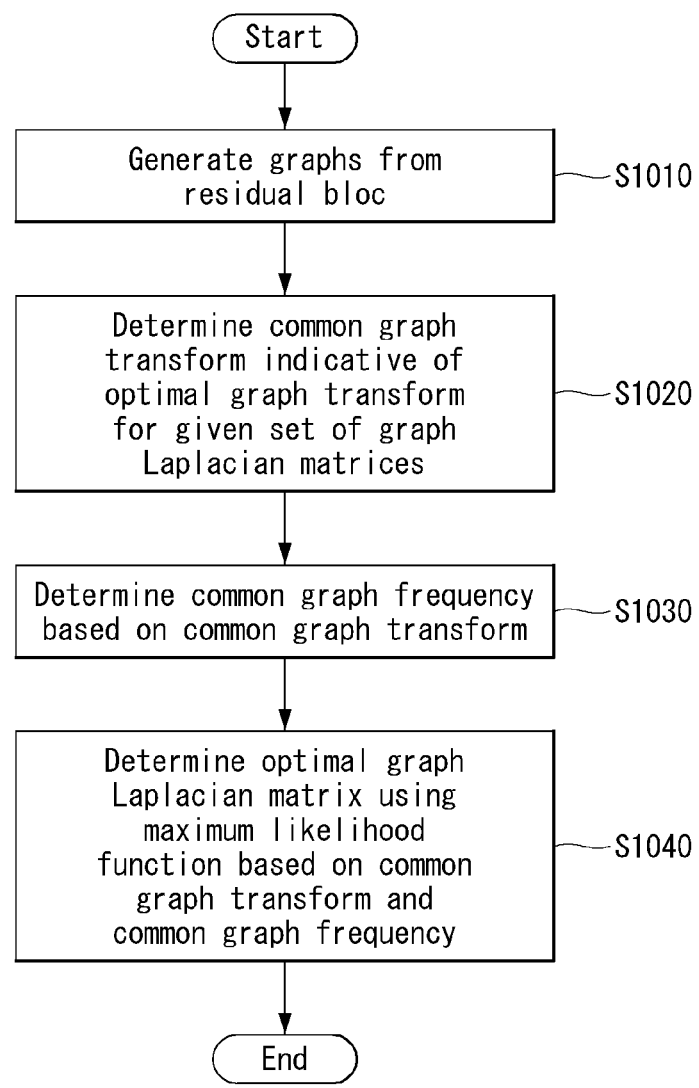
FIG. 10 is an embodiment to which the present invention is applied and shows a flowchart for illustrating that optimization is performed to generate an optimal graph and an optimal transform.

FIG. 10 is an embodiment to which the present invention is applied and shows a flowchart for illustrating that optimization is performed to generate an optimal graph and an optimal transform.

The present invention provides a method of determining an optimal combined graph by estimating the best common graph transform (CGT) and then estimating the best common graph frequency (CGF).

The encoder may generate graphs from a residual block (S1010).

The encoder may determine a common graph transform indicative of an optimal graph transform for a given set of graph Laplacian matrices (S1020).

The encoder may determine a common graph frequency based on the common graph transform (S1030). In this case, the common graph frequency indicates the function of common graph transform frequencies obtained with respect to the given set of graph Laplacian matrices.

The encoder may determine an optimal graph Laplacian matrix using a maximum likelihood function based on the common graph transform and the common graph frequency (S1040). In this case, Equation 27 may be used to obtain the optimal graph Laplacian matrix.

Figure 11:
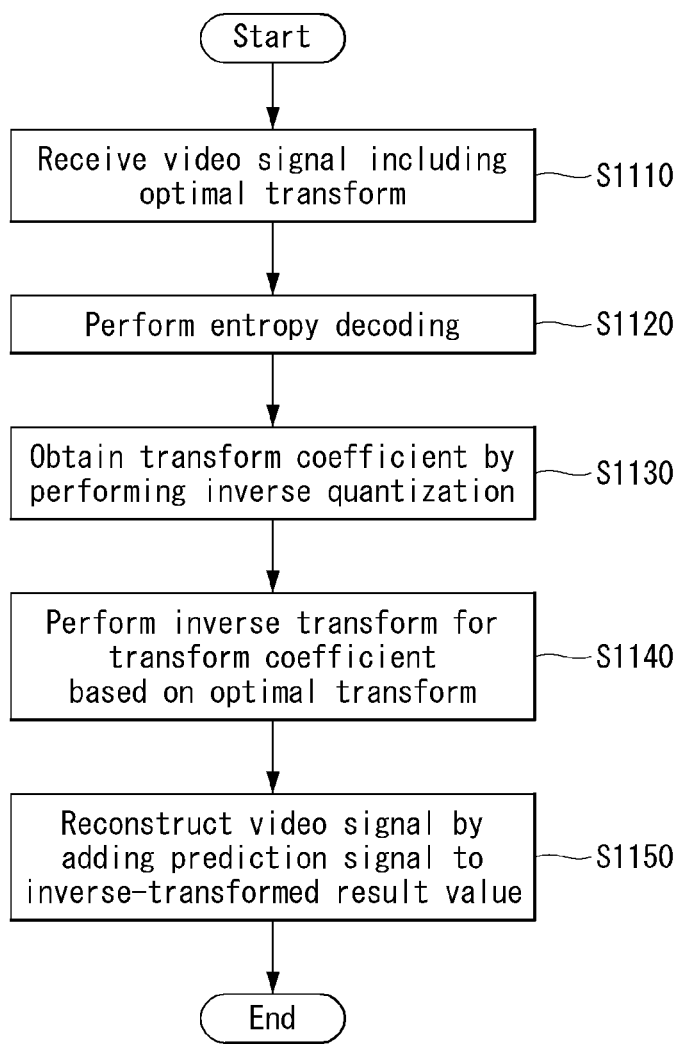
FIG. 11 is an embodiment to which the present invention is applied and shows a flowchart for illustrating a method of decoding a video signal using a single optimized graph.

FIG. 11 is an embodiment to which the present invention is applied and shows a flowchart for illustrating a method of decoding a video signal using a single optimized graph.

The decoder may receive a video signal including an optimal transform (S1110). In this case, the optimal transform may have been generated based on an optimal graph. The optimal graph may have been generated by combining graphs based on an optimization process.

In one embodiment, the optimal transform may be a non-separable transform and may be orthonormal.

In one embodiment, the optimal transform may be transmitted to the decoder, but the present invention is not limited thereto. The optimal transform may be derived from the decoder. For example, an optimal graph Laplacian matrix may be transmitted to the decoder, and the optimal transform may be derived from the optimal graph Laplacian matrix.

In one embodiment, the optimal graph may have been determined based on an intra prediction mode used in a residual block.

The decoder may obtain a transform coefficient by entropy-decoding the received video signal (S1120) and performing an inverse quantization for the entropy-decoded signal (S1130).

The decoder may perform an inverse transform for the transform coefficient based on the optimal transform (S1140).

The decoder may reconstruct a video signal by adding a prediction signal to the inverse-transformed result value (S1150).

Figure 12:
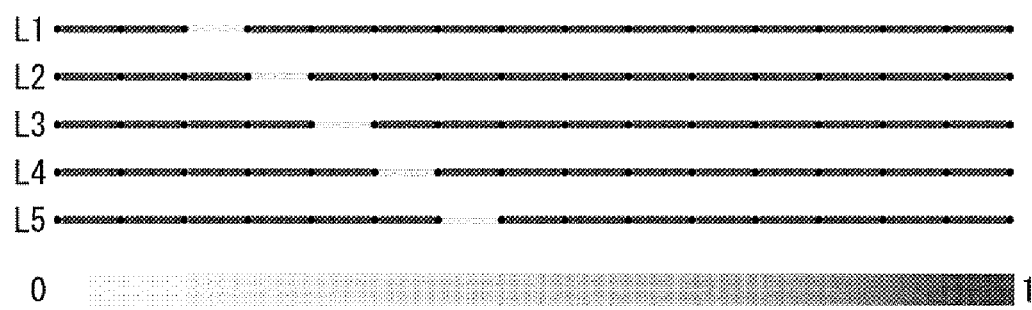
FIG. 12 is an embodiment to which the present invention is applied and shows line graphs and graphs in which the line graphs have been combined.
Figure 12:
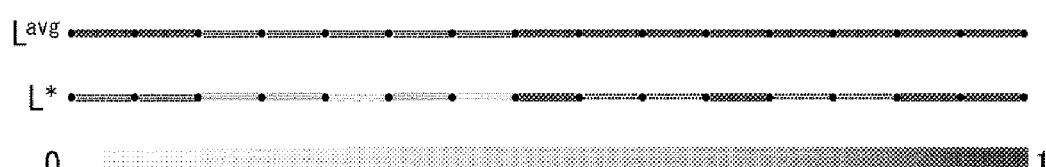
Figure 13:
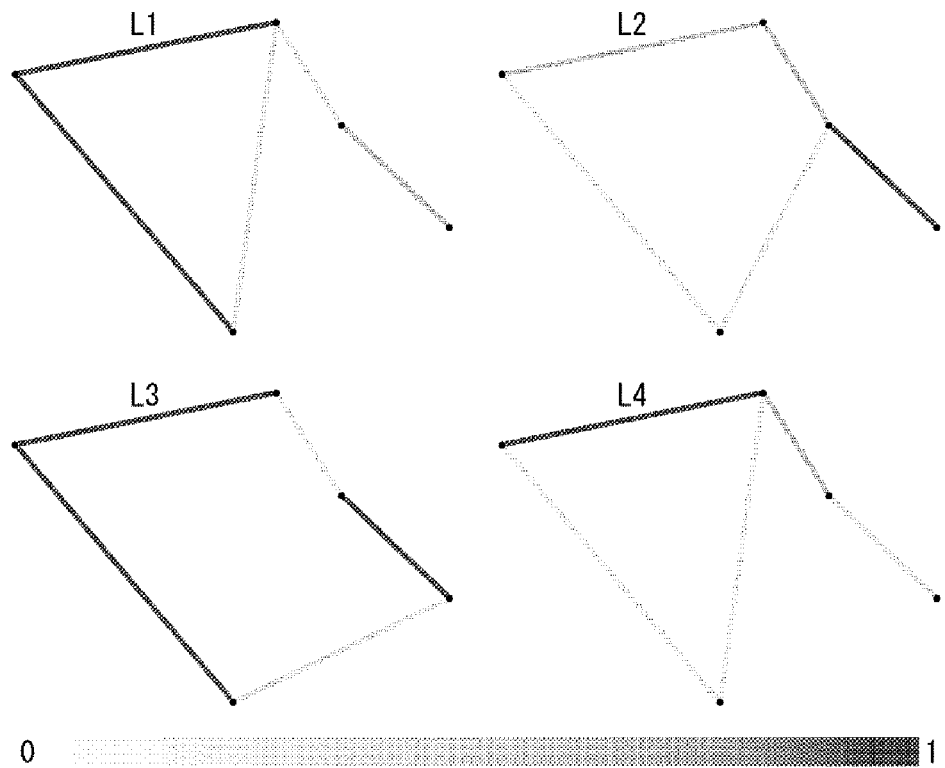
FIG. 13 is an embodiment to which the present invention is applied and shows mesh-like graphs and graphs in which the mesh-like graphs have been combined.
Figure 13:
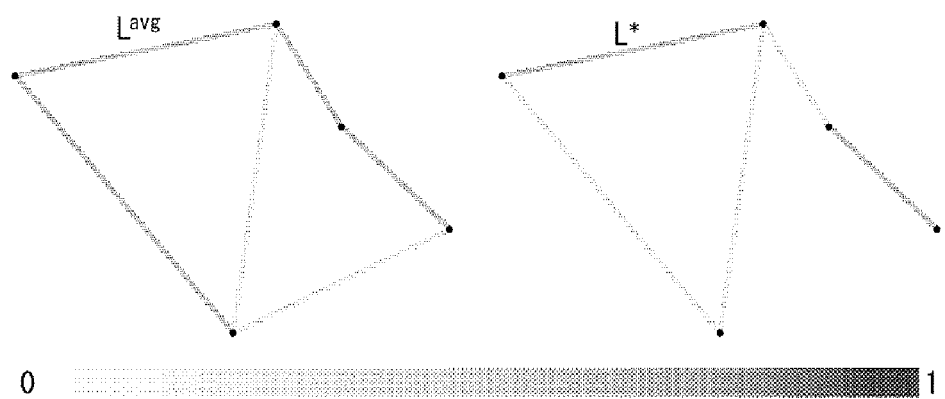

FIG. 12 is an embodiment to which the present invention is applied and shows line graphs and graphs in which the line graphs have been combined, and FIG. 13 is an embodiment to which the present invention is applied and shows mesh-like graphs and graphs in which the mesh-like graphs have been combined.

From FIG. 12(a), 5 line graphs (k=5), each one having 16 nodes (d=16), may be checked. In this case, an edge weight may be color-coded as a value of 0~1.

From FIG. 12(a), it may be seen that each input graph has only one weak edge weight (e.g., 0.1) and the remaining other edges have been weighted as 0.95.

FIG. 12(b) show graphs in which the line graphs have been combined. In FIG. 12(b), an upper graph shows an averaged and combined graph, and a lower graph shows an optimal combined graph to which the present invention has been applied.

FIG. 13 shows mesh-like graphs and graphs in which the mesh-like graphs have been combined. FIG. 13(a) shows 4 mesh-like graphs (k=4), each one having 5 nodes (d=5). In this case, an edge weight may be color-coded as a value of 0~1.

FIG. 13(b) shows graphs in which the mesh-like graphs have been combined. In FIG. 13(b), a left graph shows an averaged and combined graph, and a right graph shows an optimal combined graph to which the present invention has been applied.

FIG. 14 is an embodiment to which the present invention is applied and is a table showing coding gain and average quadratic cost results for the graphs in FIG. 12. FIG. 15 is an embodiment to which the present invention is applied and is a table showing coding gain and average quadratic cost results for the graphs in FIG. 14.

The present invention presents experiment results that confirm performance of the graph combination algorithm (refer to Table 1) to which the present invention has been applied compared to an averaging method. In the averaging method, given k graph Laplacian matrices $L_1, \ldots, L_k$ may be combined as in Equation 28.

$$L^{avg} = \frac{1}{k}\sum_{i=1}^{k} L_i \quad \text{[Equation 28]}$$

In the present invention, two different metrics are used to estimate graph combination performance. First, a coding gain, that is, a common metric used for an information theory and compression, is used. This metric is used to estimate how well a designed common graph transform U diagonalizes $L_+$ as in Equation 29.

$$CG(U, L) = \left( \frac{\prod_{i=1}^{d} (L^+)_{ii}}{\prod_{i=2}^{d} (U^t L^+ U)_{ii}} \right)^{1/d} \quad \text{[Equation 29]}$$

A metric that is second used is an average quadratic cost that estimates an average change of p signals $(\{y_s\}_{s=1}^{P})$ regarding a graph Laplacian matrix L. This is shown in Equation 30.

$$AQC(\{y_s\}_{n=1}^p, L) = \frac{1}{p} \sum_{n=1}^{p} y_s^t L y_s \qquad \text{[Equation 30]}$$

In the present invention, p=100 samples are randomly selected from the distribution of Equation 4 with respect to each of the input graphs $L_1, \ldots, L_k$, and an average quadratic cost of combined graphs $L_+$ and Lavg is estimated.

In contrast, the coding gain of each of the input graphs $L_1, \ldots, L_k$ is directly calculated using $U_+$ and Uavg obtained from $L_+$ and Lavg, respectively. FIGS. 12 and 13 show the input graphs of line and mesh structures and the combined graph results $L_+$ and Lavg, and corresponding coding gain and quadratic cost results are shown in FIGS. 14 and 15. Such results reveal that the graph combination algorithm to which the present invention has been applied is better than the averaging method because it provides a higher coding gain and a lower average quadratic cost.

As described above, in this specification, a new problem construction has been introduced using a maximum likelihood criterion, and a new framework for a graph combination has been introduced by proposing common graph transform estimation and common graph frequency estimation. The experiment results show that the proposed graph combination method induces a better model than the average graph model in terms of two known metrics; a coding gain and a quadratic Laplacian cost.

As described above, the embodiments explained in the present invention may be implemented and performed on a processor, a micro-processor, a controller or a chip. For example, functional modules explained in FIG. 1, FIG. 2 and FIGS. 5 to 8 may be implemented and performed on a computer, a processor, a microprocessor, a controller or a chip.

As described above, the decoder and the encoder to which the present invention is applied may be included in a multimedia broadcasting transmission/reception apparatus, a mobile communication terminal, a home cinema video apparatus, a digital cinema video apparatus, a surveillance camera, a video chatting apparatus, a real-time communication apparatus, such as video communication, a mobile streaming apparatus, a storage medium, a camcorder, a VoD service providing apparatus, an Internet streaming service providing apparatus, a three-dimensional 3D video apparatus, a teleconference video apparatus, and a medical video apparatus and may be used to code video signals and data signals.

Furthermore, the decoding/encoding method to which the present invention is applied may be produced in the form of a program that is to be executed by a computer and may be stored in a computer-readable recording medium. Multimedia data having a data structure according to the present invention may also be stored in computer-readable recording media. The computer-readable recording media include all types of storage devices in which data readable by a computer system is stored. The computer-readable recording media may include a BD, a USB, ROM, RAM, CD-ROM, a magnetic tape, a floppy disk, and an optical data storage device, for example. Furthermore, the computer-readable recording media includes media implemented in the form of carrier waves (e.g., transmission through the Internet). Furthermore, a bit stream generated by the encoding method may be stored in a computer-readable recording medium or may be transmitted over wired/wireless communication networks.

INDUSTRIAL APPLICABILITY

The exemplary embodiments of the present invention have been disclosed for illustrative purposes, and those skilled in the art may improve, change, replace, or add various other embodiments within the technical spirit and scope of the present invention disclosed in the attached claims.

The invention claimed is:

1. A method of encoding a video signal using a single optimized graph, comprising:
    obtaining a residual block;
    generating graphs from the residual block;
    generating an optimal graph and an optimal transform by combining the graphs, wherein the graphs are combined based on an optimization process, wherein the optimal graph is determined based on an intra prediction mode used in the residual block; and
    performing a transform for the residual block based on the optimal graph and the optimal transform,
    wherein the optimization process comprises:
    determining a common graph transform indicative of an optimal graph transform for a given set of graph Laplacian matrices;
    determining a common graph frequency based on the common graph transform, wherein the common graph frequency indicates a function of common graph transform frequencies obtained with respect to the given set of graph Laplacian matrices, and corresponds to a diagonal matrix $\hat{\Lambda} = \text{diag}([0, \lambda_2, \ldots, \lambda_d])$ where $\lambda_d$ is the (j, j)-th entry of $\hat{\Lambda}$; and
    determining an optimal graph Laplacian matrix using a maximum likelihood function based on the common graph transform and the common graph frequency.

2. The method of claim 1, further comprising transmitting the optimal graph and the optimal transform.

3. The method of claim 1, wherein the optimal transform is a non-separable transform and is orthonormal.

4. The method of claim 1, wherein the graphs are obtained using edge information of the residual block.

5. A method of decoding a video signal using a single optimized graph,
    receiving the video signal comprising an optimal transform;
    obtaining a transform coefficient through entropy decoding and inverse quantization; and
    performing inverse transform on the transform coefficient based on the optimal transform, wherein the optimal transform has been generated based on an optimal graph and the optimal graph has been generated by combining graphs based on an optimization process,
    wherein the optimal graph has been determined based on an intra prediction mode used in a residual block corresponding to the transform coefficient, and
    wherein the optimization process comprises:
    determining a common graph transform indicative of an optimal graph transform for a given set of graph Laplacian matrices;
    determining a common graph frequency based on the common graph transform, wherein the common graph frequency indicates a function of common graph transform frequencies obtained with respect to the given set of graph Laplacian matrices, and corresponds to a diagonal matrix $\hat{\Lambda} = \text{diag}([0, \lambda_2, \ldots, \lambda_d])$ where $\lambda_d$ is the (j, j)-th entry of $\hat{\Lambda}$; and determining an optimal graph Laplacian matrix using a maximum likelihood function based on the common graph transform and the common graph frequency.

6. The method of claim 5, wherein the optimal transform is a non-separable transform and is orthonormal.

7. The method of claim 5, wherein the graphs are obtained using edge information of the residual block.

8. An apparatus for encoding a video signal using a single optimized graph, comprising:
   a graph generation unit configured to generate graphs from a residual block;
   an optimization unit configured to generate an optimal graph and an optimal transform by combining the graphs, wherein the optimal graph is determined based on an intra prediction mode used in the residual block; and
   a transform unit configured to performing a transform on the residual block based on the optimal graph and the optimal transform,
   wherein the graphs are combined based on an optimization process,
   wherein the optimization unit determines a common graph transform indicative of an optimal graph transform for a given set of graph Laplacian matrices, determines a common graph frequency based on the common graph transform, and determines an optimal graph Laplacian matrix using a maximum likelihood function based on the common graph transform and the common graph frequency, and
   wherein the common graph frequency indicates a function of common graph transform frequencies obtained with respect to the given set of graph Laplacian matrices, and corresponds to a diagonal matrix $\hat{\Lambda}=\text{diag}([0, \lambda_2, \ldots, \lambda_d])$ where $\lambda_d$ is the (j, j)-th entry of $\hat{\Lambda}$.

9. An apparatus for decoding a video signal using a single optimized graph, comprising:
   a reception unit configured to receive the video signal comprising an optimal transform;
   an entropy decoding unit configured to entropy-decode a residual signal;
   an inverse quantization unit configured to obtain a transform coefficient by inverse quantizing the entropy-decoded residual signal; and
   an inverse transform unit configured to perform an inverse transform for the transform coefficient based on the optimal transform,
   wherein the optimal transform has been generated based on an optimal graph and the optimal graph has been generated by combining graphs based on the optimization process,
   wherein the optimal graph has been determined based on an intra prediction mode used in a residual block corresponding to the transform coefficient, and
   wherein the optimization process comprises:
   determining a common graph transform indicative of an optimal graph transform for a given set of graph Laplacian matrices;
   determining a common graph frequency based on the common graph transform, wherein the common graph frequency indicates a function of common graph transform frequencies obtained with respect to the given set of graph Laplacian matrices, and corresponds to a diagonal $\hat{\Lambda}=\text{diag}([0, \lambda_2, \ldots, \lambda_d])$ where $\lambda_d$ is the (j, j)-th entry of $\hat{\Lambda}$; and
   determining an optimal graph Laplacian matrix using a maximum likelihood function based on the common graph transform and the common graph frequency.

* * * * *